(12) United States Patent
Maekawa et al.

(10) Patent No.: US 11,657,160 B2
(45) Date of Patent: May 23, 2023

(54) VULNERABILITY ANALYZER

(71) Applicant: Yazaki Corporation, Tokyo (JP)

(72) Inventors: Yosuke Maekawa, Shizuoka (JP); Shigeki Sano, Shizuoka (JP); Hiroaki Saji, Shizuoka (JP); Yoichi Komatsu, Shizuoka (JP); Yutaro Enomoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 310 days.

(21) Appl. No.: 17/073,598

(22) Filed: Oct. 19, 2020

(65) Prior Publication Data

US 2021/0117550 A1 Apr. 22, 2021

(30) Foreign Application Priority Data

Oct. 21, 2019 (JP) .............................. JP2019-191864

(51) Int. Cl.
*G06F 21/57* (2013.01)
*G06F 12/02* (2006.01)
*G06F 12/14* (2006.01)

(52) U.S. Cl.
CPC ........ *G06F 21/577* (2013.01); *G06F 12/0223* (2013.01); *G06F 12/14* (2013.01); *G06F 2212/1052* (2013.01); *G06F 2221/033* (2013.01)

(58) Field of Classification Search
CPC .... G06F 21/577; G06F 12/0223; G06F 12/14; G06F 2212/1052; G06F 2221/033; G06F 21/563; G06F 21/566
See application file for complete search history.

(56) References Cited

U.S. PATENT DOCUMENTS

2012/0042145 A1* 2/2012 Sehr .................. G06F 21/53
711/E12.091

FOREIGN PATENT DOCUMENTS

JP          2018-156159 A       10/2018

OTHER PUBLICATIONS

X. Zhuang, T. Zhang and S. Pande, "Using Branch Correlation to Identify Infeasible Paths for Anomaly Detection," 2006 39th Annual IEEE/ACM International Symposium on Microarchitecture (MICRO'06), 2006, pp. 113-122.*

(Continued)

*Primary Examiner* — Matthew T Henning
(74) *Attorney, Agent, or Firm* — Sughrue Mion, PLLC

(57) ABSTRACT

A vulnerability analyzer includes: a single route derivation unit for deriving single route information from an attack determination position to a start position of program information; a variable analysis unit for deriving actual value range information from information of a branch condition and a branch result in the program information; a memory editing unit for setting a virtual address and an input flag corresponding to input variable information, storing actual value information of the input variable information, and storing actual value range information from the variable analysis unit; and a vulnerability existence determination unit for extracting variable information of an attack execution condition, acquiring the actual value information and the actual value range information corresponding the variable information, calculating limited input actual value information when the input flag is set to the virtual address, and determining if the limited input actual value information satisfies the attack execution condition.

8 Claims, 25 Drawing Sheets

(56) References Cited

OTHER PUBLICATIONS

Komal Pathade and Uday P. Khedker. "Computing partially path-sensitive MFP solutions in data flow analyses." In Proceedings of the 27th International Conference on Compiler Construction (CC 2018). Association for Computing Machinery, New York, NY, USA, 37-47.*

* cited by examiner

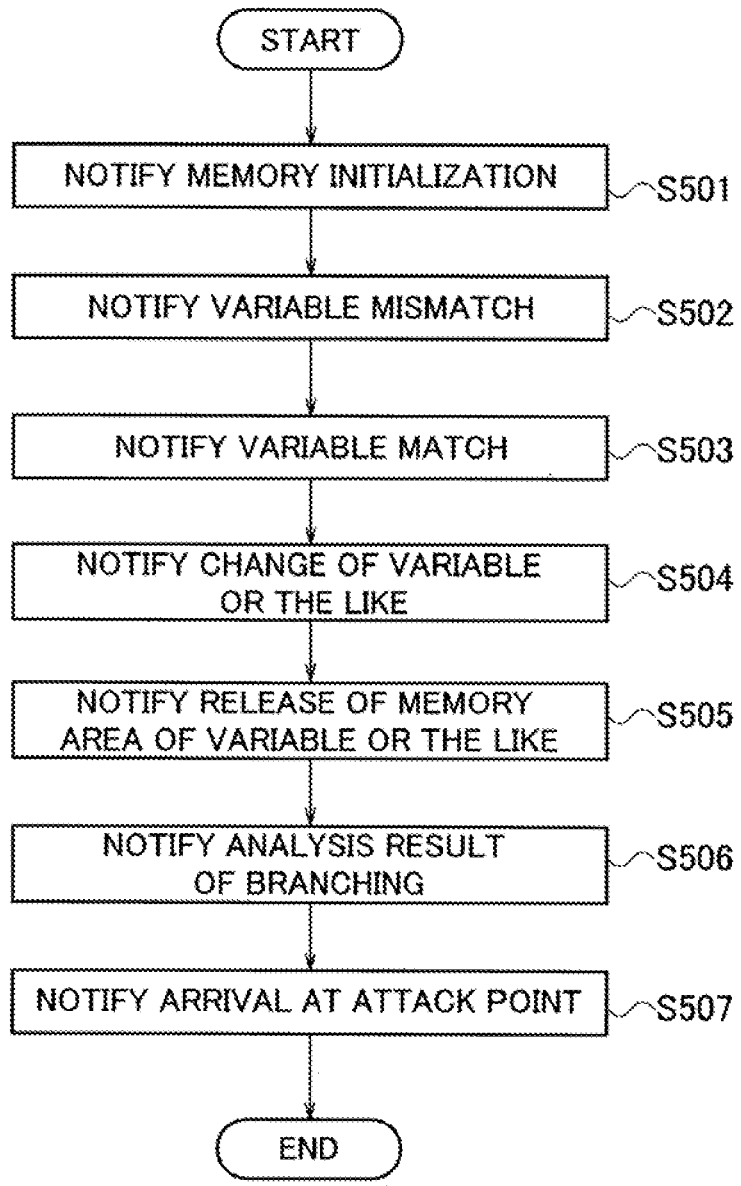

OPERATION OUTLINE OF STEP S502

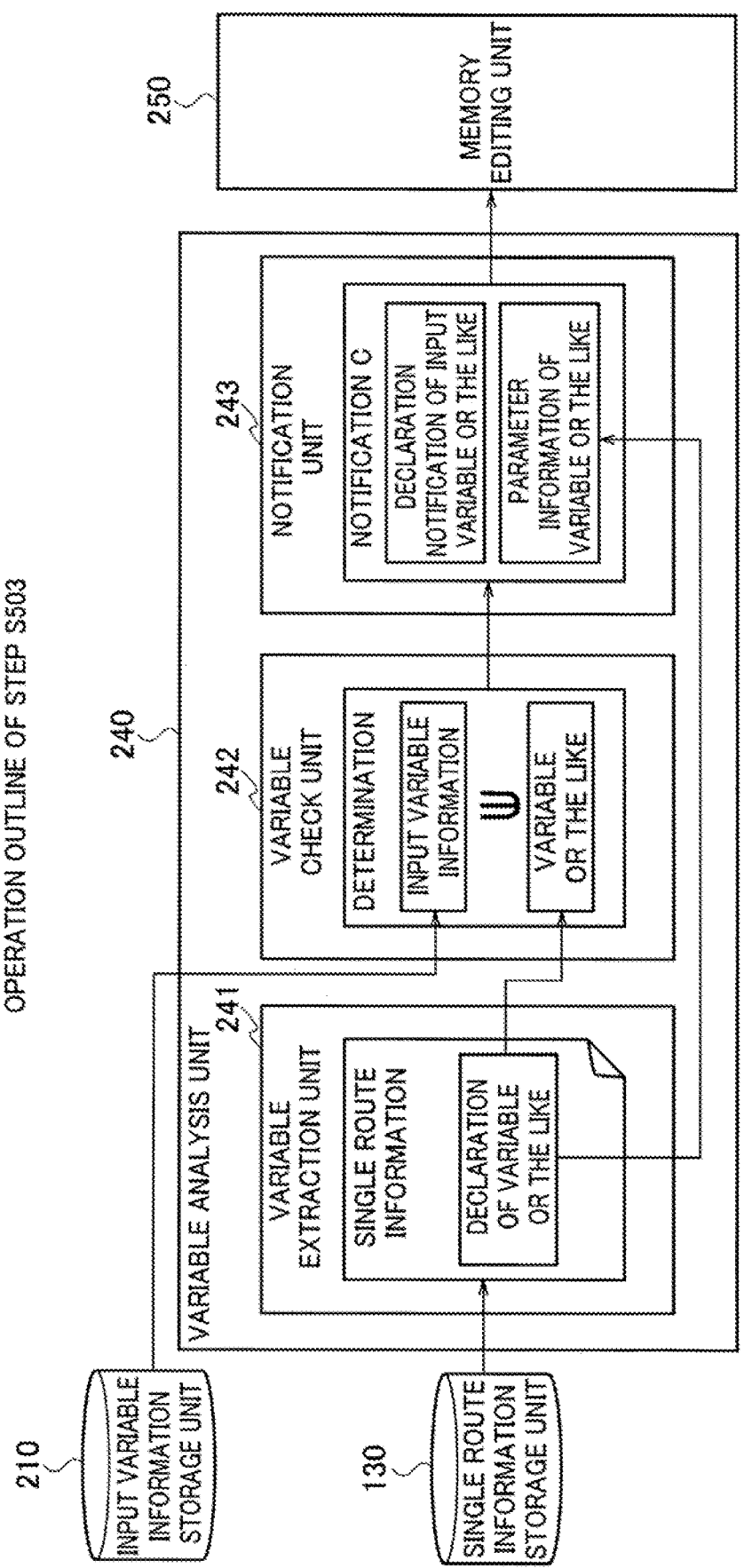

OPERATION OUTLINE OF STEP S504

OPERATION OUTLINE OF STEP S505

OPERATION OUTLINE OF STEP S506

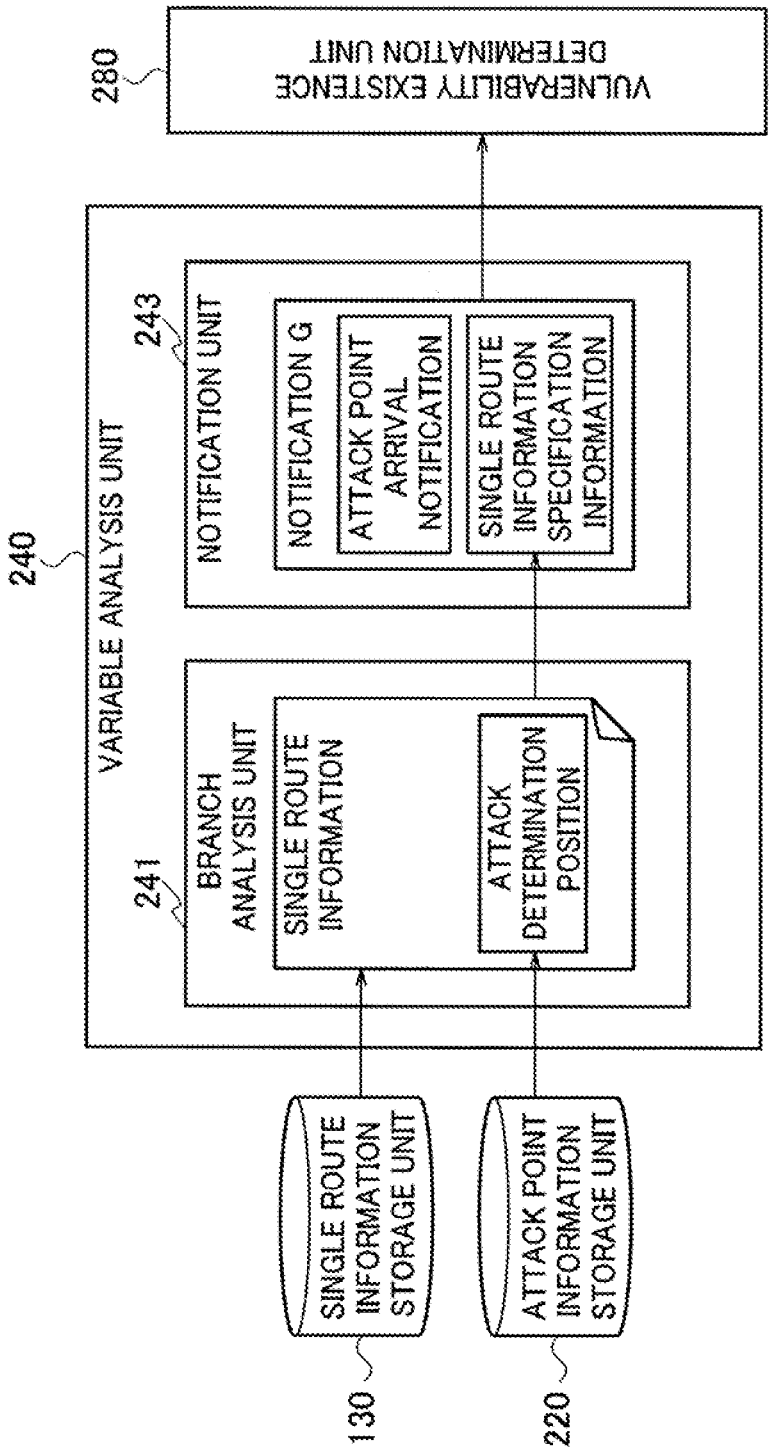

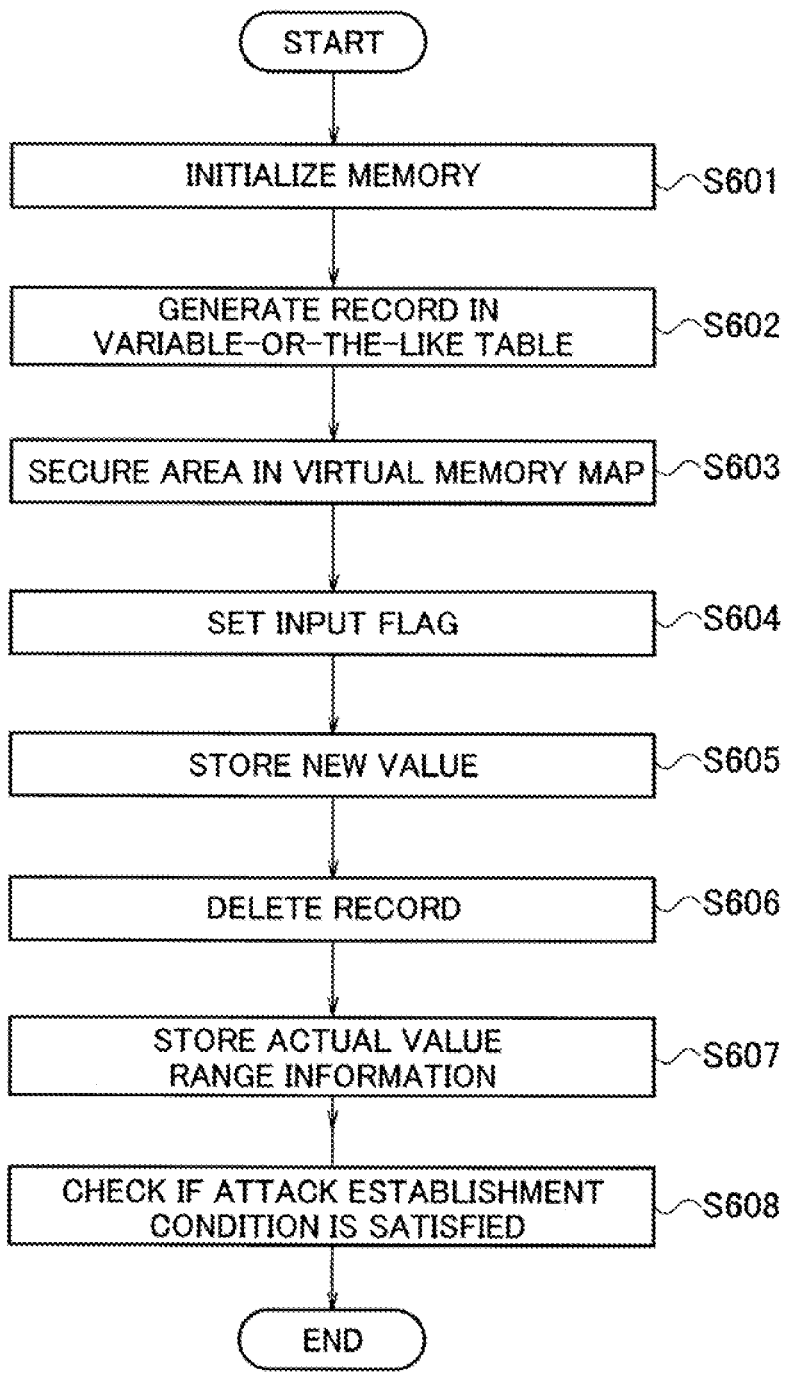

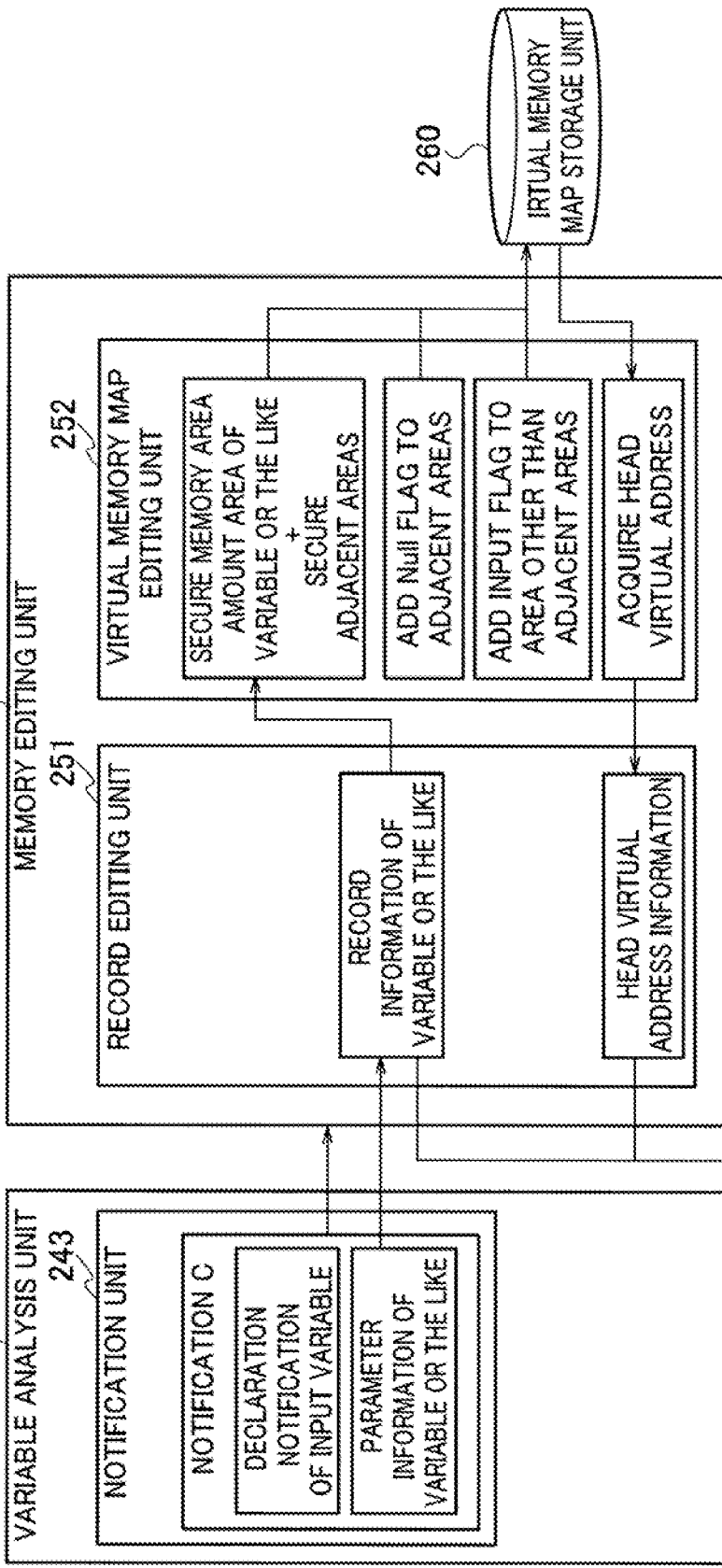

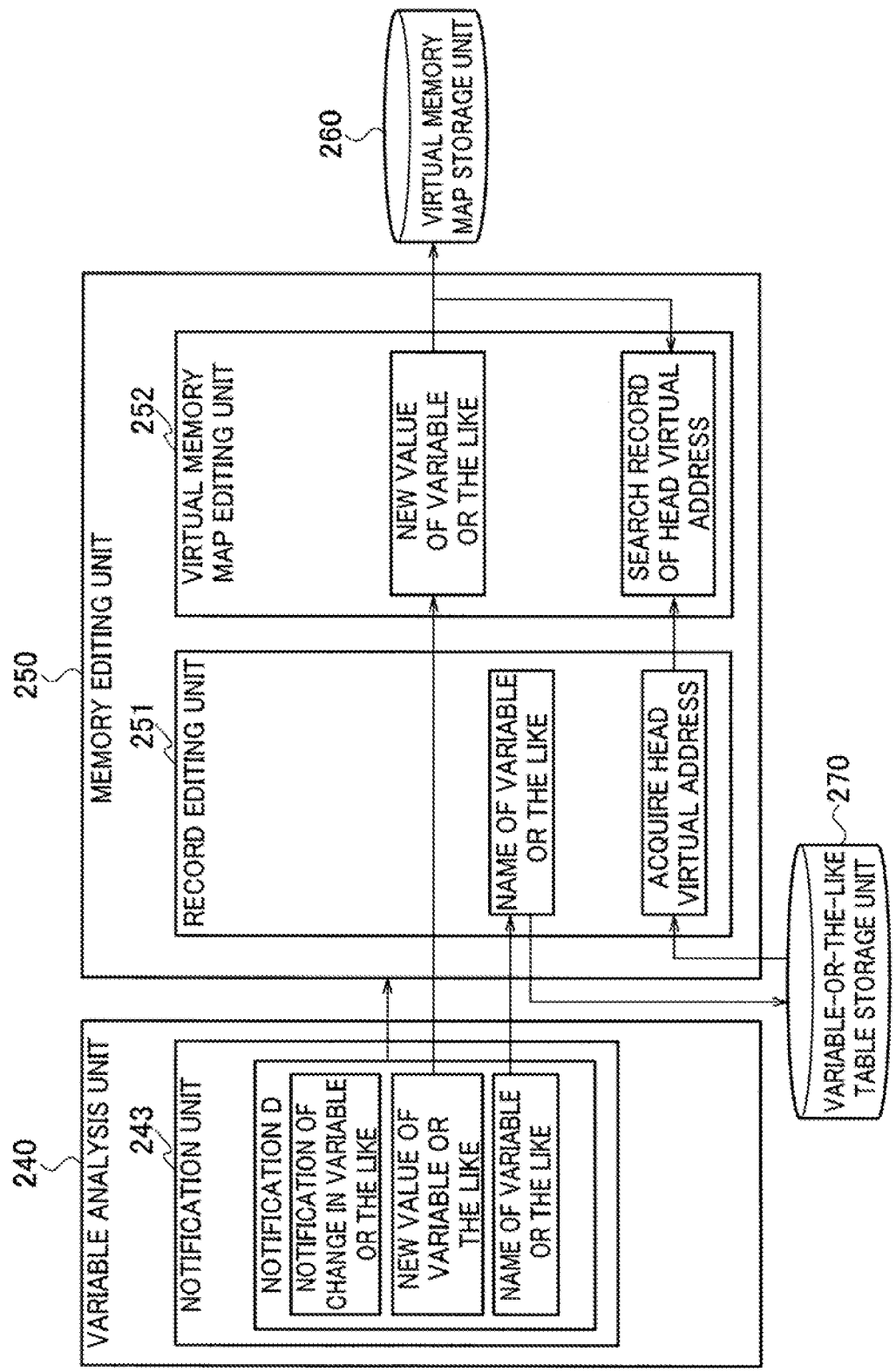

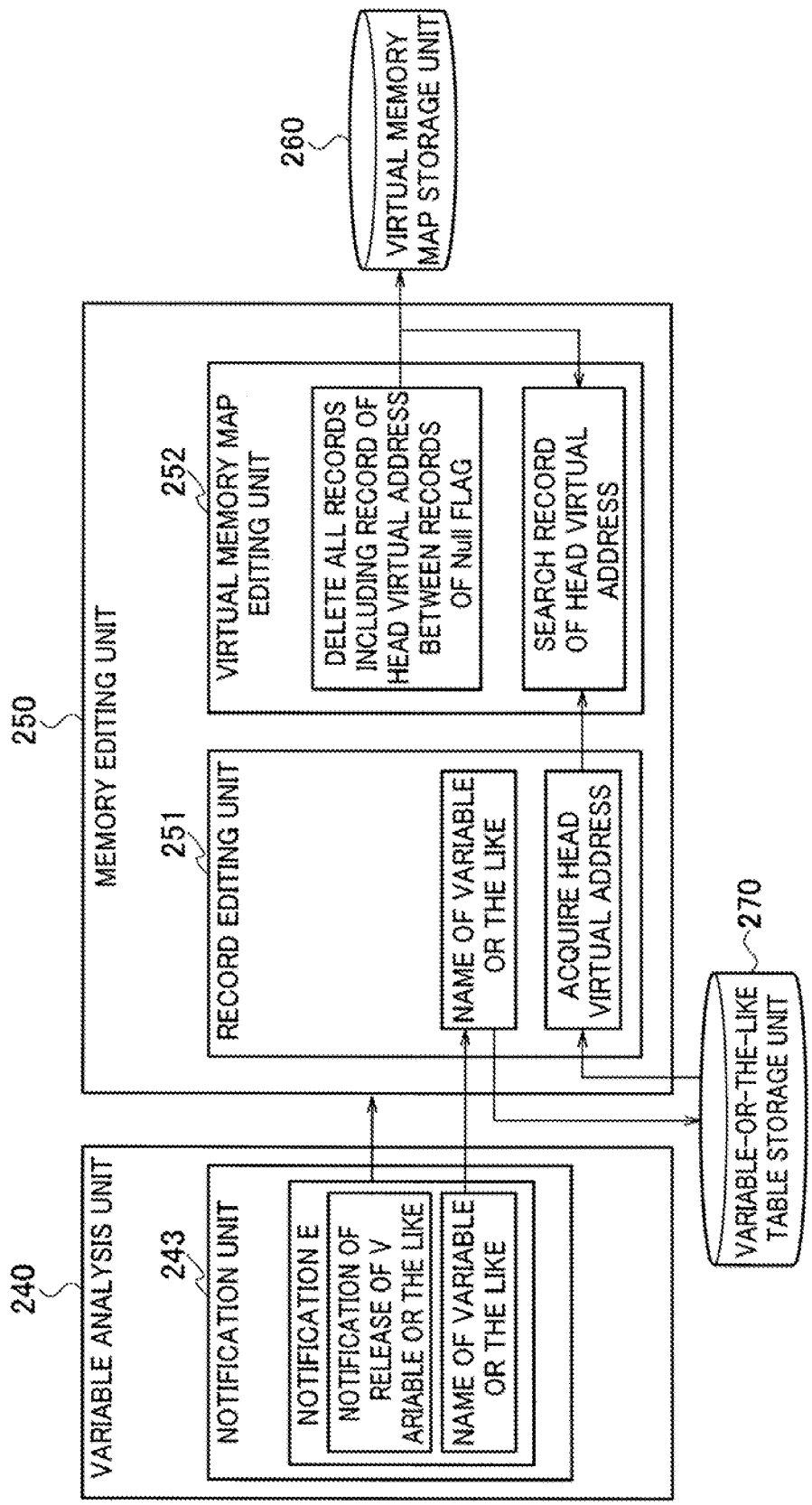

FIG. 6F

OPERATION OUTLINE OF STEP S607

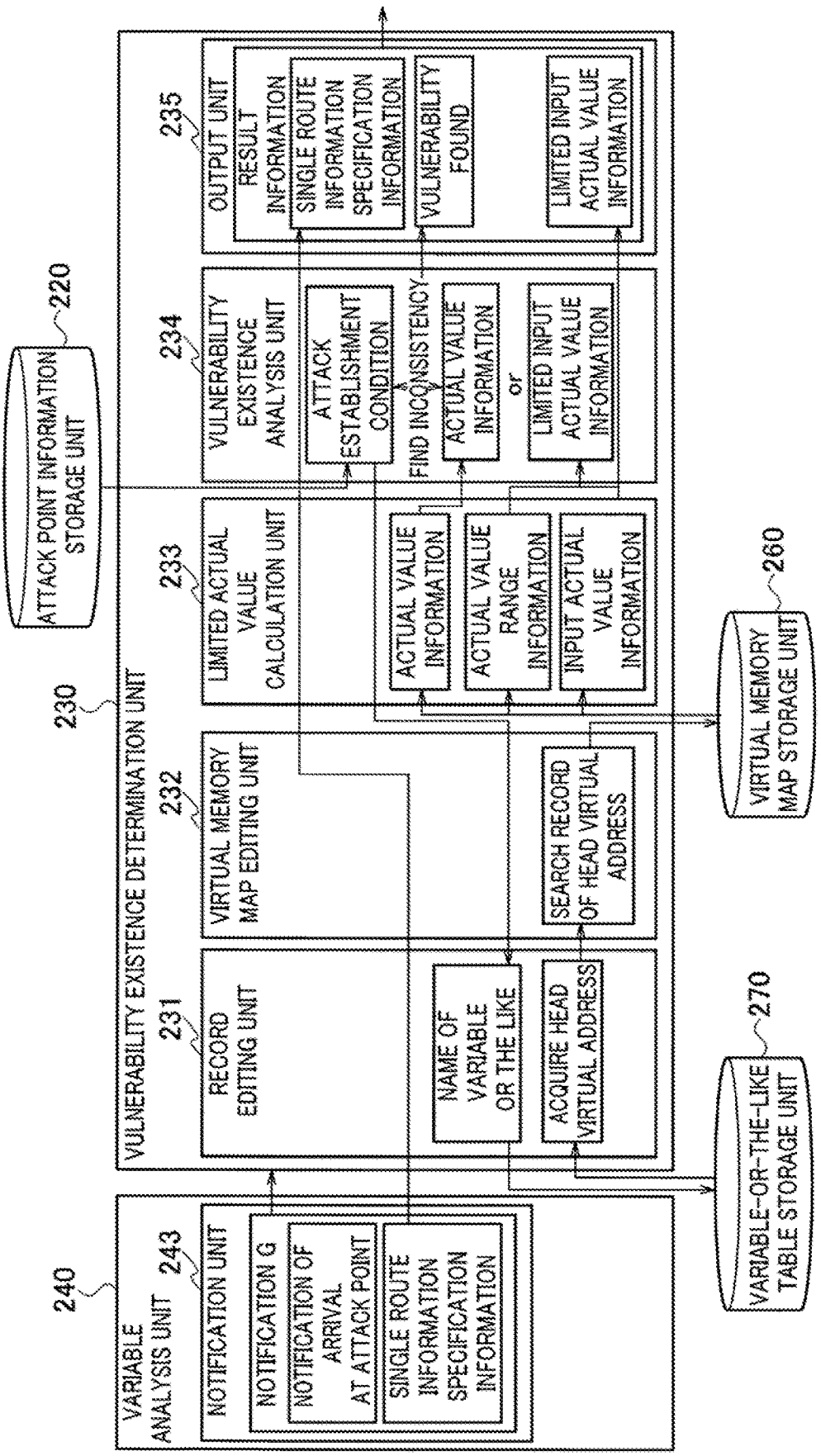

FIG. 7A

PROGRAM
INFORMATION

*(0xFF01) = 60;

VIRTUAL MEMORY MAP

| VIRTUAL ADDRESS | ACTUAL ADDRESS | Null FLAG | ACTUAL VALUE | ACTUAL VALUE RANGE | INPUT FLAG |
|---|---|---|---|---|---|
| 0x4000 | | null | | | |
| 0x4001 | 0xFF01 | | 60 | | |
| 0x4002 | | null | | | |
| | | | | | |
| | | | | | |
| | | | | | |
| | | | | | |

FIG. 7B

VARIABLE DECLARATION

PROGRAM INFORMATION

```
char cData;
```

VIRTUAL MEMORY MAP

| VIRTUAL ADDRESS | ACTUAL ADDRESS | Null FLAG | ACTUAL VALUE | ACTUAL VALUE RANGE | INPUT FLAG |
|---|---|---|---|---|---|
| 0x1000 | | null | | | |
| 0x1001 | | | | | |
| 0x1002 | | null | | | |
| | | | | | |
| | | | | | |
| | | | | | |
| | | | | | |
| | | | | | |

VARIABLE TABLE

| VARIABLE NAME | HEAD VIRTUAL ADDRESS | TYPE |
|---|---|---|
| cData | 0x0001 | char |
| | | |
| | | |
| | | |
| | | |
| | | |
| | | |
| | | |

VARIABLE SUBSTITUTION

PROGRAM INFORMATION

```
char cData;
cData = 10;
```

VIRTUAL MEMORY MAP

| VIRTUAL ADDRESS | ACTUAL ADDRESS | Null FLAG | ACTUAL VALUE | ACTUAL VALUE RANGE | INPUT FLAG |
|---|---|---|---|---|---|
| 0x1000 | | null | | | |
| 0x1001 | | | 10 | | |
| 0x1002 | | null | | | |
| | | | | | |
| | | | | | |
| | | | | | |
| | | | | | |
| | | | | | |

VARIABLE TABLE

| VARIABLE NAME | HEAD VIRTUAL ADDRESS | TYPE |
|---|---|---|
| cData | 0x0001 | char |
| | | |
| | | |
| | | |
| | | |
| | | |
| | | |
| | | |

FIG. 7C

UNION DECLARATION PROGRAM INFORMATION

```
union un_Int{
    char cValue:
    int  iValue:
};
union un_Int uiValue;
```

VIRTUAL MEMORY MAP

| VIRTUAL ADDRESS | ACTUAL ADDRESS | Null FLAG | ACTUAL VALUE | ACTUAL VALUE RANGE | INPUT FLAG |
|---|---|---|---|---|---|
| 0x2000 | | null | | | |
| 0x2001 | | | | | |
| 0x2002 | | | | | |
| 0x2003 | | | | | |
| 0x2004 | | | | | |
| 0x2005 | | null | | | |

UNION TABLE

| UNION NAME | HEAD VIRTUAL ADDRESS | ELEMENT TYPE | VARIABLE TYPE OF ELEMENT |
|---|---|---|---|
| uiValue | 0x2001 | cValue | char |
| uiValue | 0x2001 | iValue | int |
| | | | |
| | | | |
| | | | |
| | | | |

UNION SUBSTITUTION PROGRAM INFORMATION

```
union un_Int{
    char cValue:
    int  iValue:
};
union un_Int uiValue:
uiValue.cValue = 30;
```

VIRTUAL MEMORY MAP

| VIRTUAL ADDRESS | ACTUAL ADDRESS | Null FLAG | ACTUAL VALUE | ACTUAL VALUE RANGE | INPUT FLAG |
|---|---|---|---|---|---|
| 0x2000 | | null | | | |
| 0x2001 | | | 30 | | |
| 0x2002 | | | | | |
| 0x2003 | | | | | |
| 0x2004 | | | | | |
| 0x2005 | | null | | | |

UNION TABLE

| UNION NAME | HEAD VIRTUAL ADDRESS | ELEMENT TYPE | VARIABLE TYPE OF ELEMENT |
|---|---|---|---|
| uiValue | 0x2001 | cValue | char |
| uiValue | 0x2001 | iValue | int |
| | | | |
| | | | |
| | | | |
| | | | |

FIG. 7D

STRUCTURE DECLARATION

PROGRAM INFORMATION:
```
struct st_Int{
    char cValue;
    int  iValue;
};
struct st_Int siValue;
```

VIRTUAL MEMORY MAP

| VIRTUAL ADDRESS | ACTUAL ADDRESS | Null FLAG | ACTUAL VALUE | ACTUAL VALUE RANGE | INPUT FLAG |
|---|---|---|---|---|---|
| 0x3000 | | null | | | |
| 0x3001 | | | | | |
| 0x3002 | | | | | |
| 0x3003 | | | | | |
| 0x3004 | | | | | |
| 0x3005 | | | | | |
| 0x3006 | | null | | | |

STRUCTURE TABLE

| STRUCTURE NAME | HEAD VIRTUAL ADDRESS | ELEMENT TYPE | VARIABLE TYPE OF ELEMENT |
|---|---|---|---|
| siValue | 0x3001 | cValue | char |
| siValue | 0x3002 | iValue | int |
| | | | |
| | | | |
| | | | |
| | | | |

STRUCTURE SUBSTITUTION

PROGRAM INFORMATION:
```
struct st_Int{
    char cValue;
    int  iValue;
};
struct st_Int siValue;

siValue.cValue = 40;
siValue.iValue = 50;
```

VIRTUAL MEMORY MAP

| VIRTUAL ADDRESS | ACTUAL ADDRESS | Null FLAG | ACTUAL VALUE | ACTUAL VALUE RANGE | INPUT FLAG |
|---|---|---|---|---|---|
| 0x3000 | | null | | | |
| 0x3001 | | | 40 | | |
| 0x3002 | | | 50 | | |
| 0x3003 | | | | | |
| 0x3004 | | | | | |
| 0x3005 | | | | | |
| 0x3006 | | null | | | |

STRUCTURE TABLE

| STRUCTURE NAME | HEAD VIRTUAL ADDRESS | ELEMENT TYPE | VARIABLE TYPE OF ELEMENT |
|---|---|---|---|
| siValue | 0x3001 | cValue | char |
| siValue | 0x3002 | iValue | int |
| | | | |
| | | | |
| | | | |
| | | | |

FIG. 7E

ARRAY DECLARATION

PROGRAM INFORMATION

```
char cBuff[4];
```

VIRTUAL MEMORY MAP

| VIRTUAL ADDRESS | ACTUAL ADDRESS | Null FLAG | ACTUAL VALUE | ACTUAL VALUE RANGE | INPUT FLAG |
|---|---|---|---|---|---|
| 0x1000 | | null | | | |
| 0x1001 | | | | | |
| 0x1002 | | | | | |
| 0x1003 | | | | | |
| 0x1004 | | | | | |
| 0x1005 | | null | | | |
| | | | | | |

ARRAY TABLE

| VARIABLE NAME | HEAD VIRTUAL ADDRESS | ELEMENT TYPE | ELEMENT DIMENSIONALITY |
|---|---|---|---|
| cBuff | 0x1001 | char | 4 |
| | | | |
| | | | |
| | | | |
| | | | |
| | | | |
| | | | |

ARRAY SUBSTITUTION

PROGRAM INFORMATION

```
char cBuff[4];
cBuff[1] = 20
```

VIRTUAL MEMORY MAP

| VIRTUAL ADDRESS | ACTUAL ADDRESS | Null FLAG | ACTUAL VALUE | ACTUAL VALUE RANGE | INPUT FLAG |
|---|---|---|---|---|---|
| 0x1000 | | null | | | |
| 0x1001 | | | | | |
| 0x1002 | | | 20 | | |
| 0x1003 | | | | | |
| 0x1004 | | | | | |
| 0x1005 | | null | | | |
| | | | | | |

ARRAY TABLE

| VARIABLE NAME | HEAD VIRTUAL ADDRESS | ELEMENT TYPE | ELEMENT DIMENSIONALITY |
|---|---|---|---|
| cBuff | 0x1001 | char | 4 |
| | | | |
| | | | |
| | | | |
| | | | |
| | | | |
| | | | |

VULNERABILITY ANALYZER

CROSS-REFERENCE TO RELATED APPLICATIONS

The present application is based on, and claims priority from Japanese Patent Application No. 2019-191864, filed on Oct. 21, 2019, the entire contents of which are incorporated herein by reference.

TECHNICAL FIELD

The disclosure relates to a vulnerability analyzer that analyzes a vulnerability in a program.

BACKGROUND

Conventionally, there have been methods of detecting a security vulnerability existing in a program installed in a computer, and a detection method is proposed in JP 2018-156159.

In JP 2018-156159 A, each element such as a transition analysis unit, an adversary state calculation unit, a cooperator state calculation unit, and a disadvantageous state calculation unit is included as a means for detecting a vulnerability. The transition analysis unit analyzes a evaluation target program and executes a transition analysis process for obtaining a transition relationship between conditions. At that time, a transition caused by a cooperator and a transition caused by an adversary are distinguished according to a user type of the user who called the function. Next, reachability is determined. Before and after the input by the cooperator, the adversary's arbitrary input can be interrupted. The differentiated adversarial transition relations and the cooperative transition relations are alternately used, and it is determined whether or not a condition that does not satisfy the evaluation condition is reached. In this manner, each element calculates a state for outputting or set of states according to a condition or state for inputting.

SUMMARY

However, according to the disclosure of the related art described above, even when the conditions in an actual program are shown, a huge amount of calculation is required to calculate the set of states, and it is not practical to detect the security vulnerability. In other words, there is a problem that a specific method for confirming whether or not there is a possibility that the program may reach a particular inconvenient state due to an illegal input is not provided. Therefore, the disclosure has an object to provide a means that solves the above problem.

A vulnerability analyzer that evaluates whether a vulnerability of information security exists in an evaluation target program according to some embodiments, includes a single route derivation unit configured to derive single route information that maintains each process of program information in order of processing, the single route information being route information from an attack determination position where determination of existence of vulnerability of the program information is made to a start position of the program information, the single route information being information of a route derived by dividing with a branch in the program information; a variable analysis unit configured to analyze the single route information from the start position to the attack determination position, and derives actual value range information that limits a value range of an actual value from information of a branch condition and a branch result in the program information; a memory editing unit configured to set, in a case where input variable information is specified, a virtual address corresponding to the input variable information and an input flag corresponding to the virtual address, stores actual value information of the input variable information to an actual value field of the virtual address, acquires a virtual address corresponding to actual value range information notified from the variable analysis unit, and stores the actual value range information to an actual value range field of the virtual address; and a vulnerability existence determination unit configured to extract variable information used in an attack execution condition at the attack determination position, acquire a virtual address corresponding to the variable information, acquire actual value information and actual value range information corresponding to the virtual address, calculate limited input actual value information in which actual value information is limited by the actual value range information in a case where an input flag is set to the virtual address, determine whether or not the limited input actual value information satisfies the attack execution condition, and determine, in a case where an input flag is not set to the virtual address, whether or not actual value information corresponding to the virtual address satisfies the attack execution condition.

The attack execution condition may be expressed with a logical expression using variable information which is usable in the program information.

The input variable information may be variable information including a variable which is used by the evaluation target program to maintain information input from outside of the program, and the variable information may be information including a variable, a direct address value in a memory, a union, a structure, and an array.

The memory editing unit may set a null flag to virtual addresses before and after a virtual address area corresponding to the variable information.

The vulnerability existence determination unit extracts all of the virtual addresses having the input flag in a case where the attack execution condition is satisfied, sets a value of an actual value field of the virtual address as input actual value information, sets a value limited by a value of an actual value range information field corresponding to the input actual value information as limited input actual value information, and does not output the limited input actual value information in a case where the limited input actual value information does not exist in the value of the actual value field.

In a case where the vulnerability existence determination unit may determine that the attack execution condition is not satisfied, the variable analysis unit may continue to analyze another piece of single route information when there is the other piece of single route information, and the vulnerability existence determination unit may determine whether or not the attack execution condition is satisfied in the analyzed other piece of single route information.

In a case where the input flag may be not set to the virtual address corresponding to the variable information used in the actual value range information, the memory editing unit may notify the route inconsistency determination unit of the variable information, in a case where actual value information included in an actual value field of a record having the virtual address corresponding to the variable information may not be included in the actual value range information included in the actual value range field of the record having the virtual address, the route inconsistency determination unit may notify the variable analysis unit of inconsistency occurrence notification that indicates that there is a logical inconsistency, and the variable analysis unit may stop analyzing the single route information including the logical inconsistency and starts to analyze another piece of single route information when there is another piece of single route information.

The program information may be information including processing logic and procedure of a function that is realized by a program including program source code or control flow graph.

According to the disclosure, it is possible to provide a specific method for confirming whether or not there is a possibility that a program will reach a particular inconvenient state due to illegal input.

BRIEF DESCRIPTION OF DRAWINGS

FIG. 5A is a diagram illustrating an example of operations of a variable analysis unit according to the present embodiment;

FIG. 5C is a diagram illustrating an example of an operation of step S503 of FIG. 5A of the variable analysis unit according to the present embodiment;

FIG. 5G is a diagram illustrating an example of the operation of step S507 in FIG. 5A of the variable analysis unit according to the present embodiment;

FIG. 6A is a diagram illustrating an example of operations of a memory editing unit according to the present embodiment;

FIG. 6C is a diagram illustrating an example of an operation of step S604 of FIG. 6A of the memory editing unit according to the present embodiment;

FIG. 6D is a diagram illustrating an example of an operation of step S605 of FIG. 6A of the memory editing unit according to the present embodiment;

FIG. 6E is a diagram illustrating an example of an operation of step S606 of FIG. 6A of the memory editing unit according to the present embodiment;

FIG. 6F is a diagram illustrating an example of an operation of step S607 of FIG. 6A of the memory editing unit according to the present embodiment;

FIG. 6G is a diagram illustrating an example of an operation of step S608 of FIG. 6A of the memory editing unit according to the present embodiment;

FIG. 7A is a schematic diagram illustrating a case where variable or the like according to the present embodiment is direct address values on a memory;

FIG. 7B is a schematic diagram illustrating a case where the variable or the like according to the present embodiment is variables;

FIG. 7C is a schematic diagram illustrating a case where the variable or the like according to the present embodiment is unions;

FIG. 7D is a schematic diagram illustrating a case where the variable or the like according to the present embodiment is structures;

FIG. 7E is a schematic diagram illustrating a case where the variable or the like according to the present embodiment is arrays;

DETAILED DESCRIPTION

Figure 1:
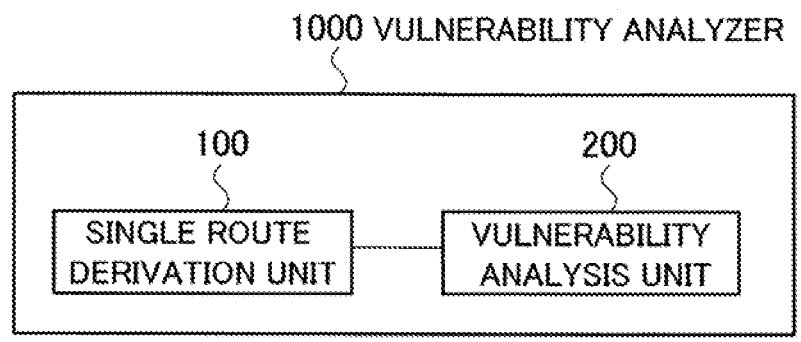
FIG. 1 is a diagram illustrating an example of a configuration of a vulnerability analyzer according to the present embodiment.

Various embodiments will be described hereinafter with reference to the accompanying drawings.

First, some technical terms used in the present embodiment and the meanings of the technical terms will be described below.

Route information: Information of procedure and processing to be followed as a processing flow in a source code of an evaluation target program or program information such as a control flow graph.

Single route information: Route information from an attack determination position to a start position of the program information where vulnerability existence determination can be made regarding program information; route information that is derived by being divided by the branch on the program information; and information that stores each process of the program information in a processing order.

Attack point information: Information including an attack determination position and an attack execution condition described below.

Attack determination position: A specific position in the program information where the existence of a vulnerability can be determined.

Attack execution condition: A condition for determining the existence of a vulnerability at the attack determination position of the program information, which is a condition expressed by a logical expression based on variables used in the program information.

Input variable: A variable or the like for the system in which the evaluation target program is implemented to store information input from outside of the system.

Variable or the like: What is used by an evaluation target program to maintain information, and includes variables, direct address values in memory, unions, structures, arrays, or the like.

Virtual memory map: Information that maintains a memory space and accompanying information that virtually simulates data expansion to a physical memory secured when executing a program. The virtual memory map includes information such as a virtual address, an actual value, an actual value range, a physical address, and the like. Note that, in the virtual memory map, one record can be managed for each virtual address.

Virtual address: Information that is maintained as a part of the virtual memory map; and information that indicates a specific area of the memory space that virtually simulates the data expansion to the physical memory secured when executing the program.

Program information: Information such as a source code of a program or a control flow graph that allows a processing logic and a procedure of a function realized by a program to be read.

Start position: A position that becomes a starting point of processing in program information. A start position can be specified by a user, or a position recognized by a compiler or a central processing unit (CPU) as a start of processing can be set as a start position.

Exit condition: In a loop of a program, a condition for terminating the loop and transitioning to the process outside the loop.

Branch result: An establishment condition for the process to transition to one branch at the branch point in program information. For example, it can be expressed in the form of a positive logical expression.

Parameter information of a variable or the like: Information required to handle a variable or the like in a program. Information such as a variable name and a variable type is included.

Actual value information: Information stored in a record of a virtual address map; and information indicating a value maintained by a variable or the like.

Actual value range information: Information stored in the record of a virtual address map; and information indicating a threshold value of an actual value such as a variable or the like associated with a specific part of a program.

(Overview of Vulnerability Analyzer)

FIG. 1 illustrates an example of a vulnerability analyzer 1000 according to the present embodiment that determines, regarding a program implemented in an electronic device in which input information is limited as an evaluation target, whether or not the program may reach a particular inconvenient state due to incorrect input information. The vulnerability analyzer 1000 includes a single route derivation unit 100 and a vulnerability analysis unit 200.

Figure 2:
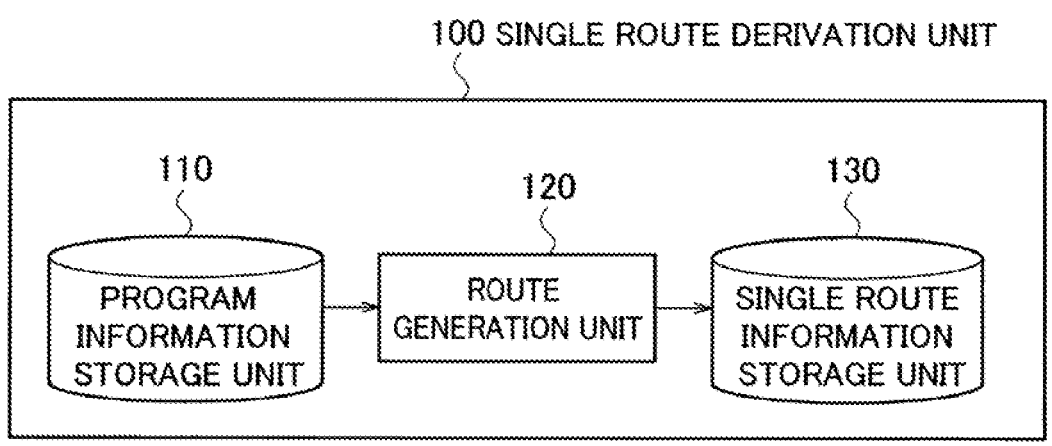
FIG. 2 is a diagram illustrating an example of a configuration of a single route derivation unit according to the present embodiment.

FIG. 2 illustrates an example of the single route derivation unit 100. The single route derivation unit 100 has function to read program information, analyze the program information, generate all pieces of single route information, which is a route from an attack determination position to a start position and is a route that is derived by being divided by branches in the program information, and maintain the information. In order to realize the above function, the single route derivation unit 100 includes a program information storage unit 110 that stores the program information, a route generation unit 120 that generates the all pieces of single route information, and a single route information storage unit 130 that stores the all pieces of generated single route information.

Figure 4:
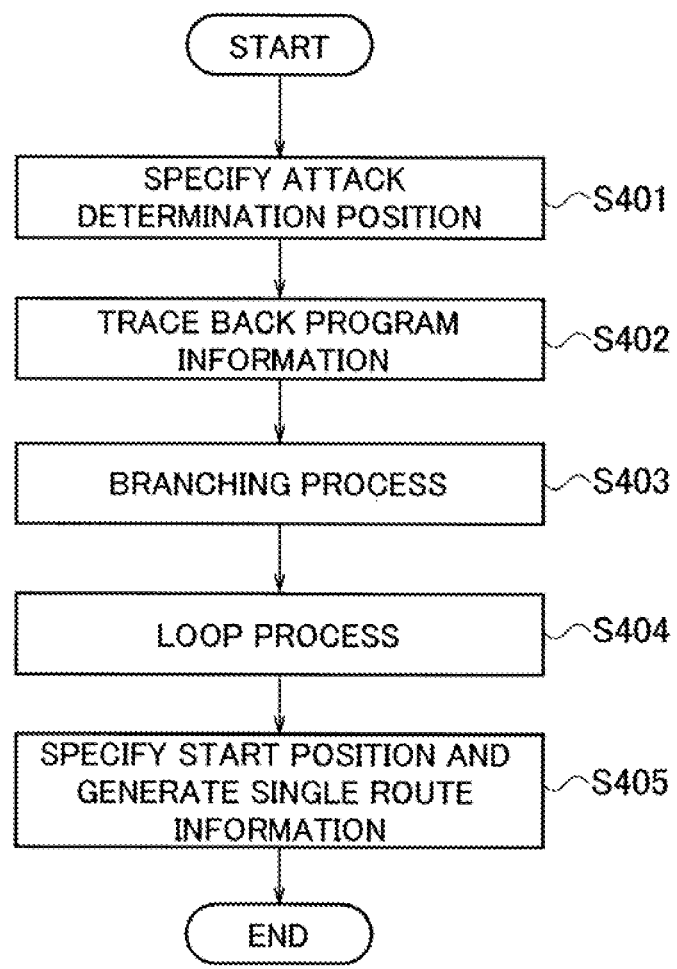
FIG. 4 is a diagram illustrating an example of an operation of the single route derivation unit according to the present embodiment.

FIG. 4 illustrates an example of an operation of the single route derivation unit 100.

In step S401, the route generation unit 120 inputs the program information from the program information storage unit 110 and specifies the attack determination position in the program information. Next, the route generation unit 120 proceeds to step S402.

In step S402, the route generation unit 120 sequentially reads each process as tracing back each process in the program information, starting from the attack determination position, and maintains the read processes as route information in the order of the reading. Note that the processing order of steps S403 and S404 described later is not limited to the present embodiment, and the route generation unit 120 can perform each processing on the program information in the order of tracing back.

In step S403, when the processing in the read program information has two branches, the route generation unit 120 creates two pieces of route information having a case where a branch condition is satisfied and a case where the branch condition is not satisfied, respectively, as a branch result of the two branches, and treats each piece of the route information as an independent route. Further, even when the number of branches is three or more, the route generation unit 120 creates same number of pieces of route information which includes a result of the branch condition as a branch result in a similar manner corresponding to the number of branch results and independently treats the information as route information. The sequential reading as tracking back after the branching process is performed for each piece of route information.

In step S404, when the process in the read program information is an end of a loop, the route generation unit 120 creates the route information by the number of exit conditions in the loop. The route generation unit 120 applies, as a branch result, a condition for satisfying each of the exit conditions to the created route information, and then treats each piece of information as independent route information. The sequential reading as tracking back after the loop processing is performed for each piece of route information.

In step S405, when the process in the read program information is the start position of the program, the route generation unit 120 maintains the route information as single route information. When there is route information that is not the single route information, the route generation unit 120 continues the derivation process of the single route information until all the route information becomes the single route information.

Figure 3:
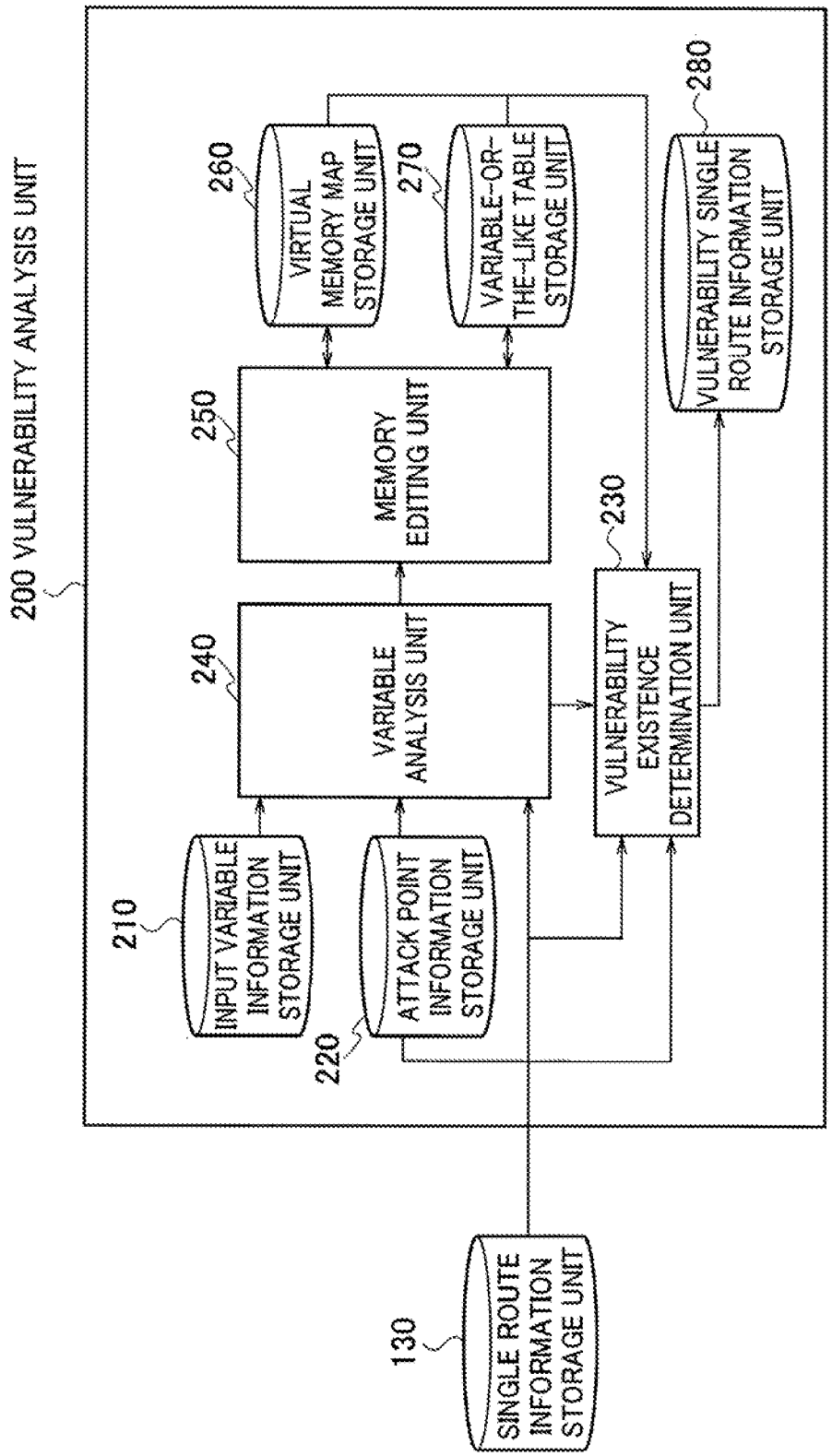
FIG. 3 is a diagram illustrating an example of a configuration of a vulnerability analysis unit according to the present embodiment.

FIG. 3 illustrates an example of the vulnerability analysis unit 200. The vulnerability analysis unit 200 acquires the single route information generated by the single route derivation unit 100, acquires input variable information designated by the user, and attack point information including attack determination position information and attack execution condition information, and sequentially analyzes the evaluation target. In the sequential analysis of the evaluation target, each processing of the evaluation target will be described in detail below. Note that the vulnerability analysis unit 200 continues the sequential analysis of the evaluation target even after notifying each process by the notification function.

In order to realize the above function, the vulnerability analysis unit 200 includes an input variable information storage unit 210 that stores the input variable information designated by the user. Furthermore, the vulnerability analysis unit 200 also includes an attack point information storage unit 220 that stores attack point information including attack determination position information and attack execution condition information. In addition, the vulnerability analysis unit 200 includes a variable analysis unit 240, a memory editing unit 250, a virtual memory map storage unit 260, a variable-or-the-like table storage unit 270, a vulnerability existence determination unit 230, and a vulnerability single route information storage unit 280 that stores single route information having a vulnerability. The operation of each component will be described in detail below.

FIG. 5A illustrates an example of operations of the variable analysis unit 240.

In step S501, the variable analysis unit 240 notifies the memory editing unit 250 that the memory clear is necessary before starting the analysis of each single route information. The notification that the memory clear is necessary may be referred to as notification A.

In step S502, the variable analysis unit 240 inputs the single route information from the single route information storage unit 130 and the input variable information from the input variable information storage unit 210. The variable analysis unit 240 analyzes the single route information, recognizes the declaration of the variable or the like included in the single route information, and when the variable or the like is not specified as the input variable information, notifies the memory editing unit 250 of the fact that the variable or the like that is not specified is declared and parameter information of the variable or the like. The notification of the fact that a variable or the like which is not specified is declared and the parameter information of the variable or the like may be referred to as notification B.

The memory editing unit 250 can recognize that the variable or the like that is not an input is correctly declared by the notification B. Further, the memory editing unit 250 can indicate that preparation for securing a virtual address area on the virtual memory map is completed according to the correct declaration.

In step S503, the variable analysis unit 240 analyzes the single route information and recognizes the description of the declaration of the variable or the like included in the single route information. Further, when the variable or the like is designated as the input variable information, the variable analysis unit 240 notifies the memory editing unit 250 of the fact that the input variable or the like belonging to the input variable information is declared and the parameter information of the variable or the like. The notification of the fact that the input variable or the like belonging to the input variable information is declared and the parameter information of the variable or the like may be referred to as notification C.

The memory editing unit 250 can recognize from the notification C that the input variables or the like have been correctly declared. Further, the memory editing unit 250 can indicate that preparation for securing a virtual address area on the virtual memory map is completed according to the correct declaration.

In step S504, every time there is a change in information of values in the memory which is associated with the variable or the like that changes as the single route information is analyzed, the variable analysis unit 240 notifies the memory editing unit 250 of the changed fact, the changed variable name, and the changed value. Notification of the changed fact, changed variable name, and changed value may be referred to as notification C.

By the notification C, the memory editing unit 250 can recognize that the variable has changed in the processing flow of the program information in the single route information, and that it is ready to hold the changed value.

In step S505, in a case where the memory area of the variable or the like is released while analyzing the single route information, the variable analysis unit 240 notifies the memory editing unit 250 of the fact that the memory area is released and the name of the released variable or the like. The notification of the fact that the memory area has been released and the name of the released variable or the like may be referred to as notification E.

The memory editing unit 250 can recognize that the variable is unnecessary in the program flow in the single route information. Further, the memory editing unit 250 can recognize that the preparation for deleting the variable is completed.

In step S506, in a case where the variable or the like is used for a branch condition of a place where there is a branch in the program information while analyzing the single route information, the variable analysis unit 240 derives actual value range information, which limits the value range of an actual value, from the information of the branch condition and the branch result. The variable analysis unit 240 notifies the memory editing unit 250 of the fact that there is a branch caused by the variable or the like, the name of the variable or the like, and the actual value range information. The notification of the fact that there is a branch caused by the variable or the like, the name of the variable or the like, and the actual value range information may be referred to as notification F. The actual value range information is information derived from the range of the variable such that the branch condition is the branch result. Note that, in a case where a plurality of variables or the like are used as the branch condition, the above-mentioned processing is executed by the variable analysis unit 240 for each variable or the like.

The memory editing unit 250 can recognize from the notification F that there is a branch in the program flow in the single route information. It is possible to derive the limit range of values which the variable can take from the actual value range information, and the memory editing unit 250 can recognize that the preparation for maintaining the actual value range of the variable is completed.

In step S507, when reaching a place indicated by the attack determination position information while analyzing the single route information, the variable analysis unit 240 notifies the vulnerability existence determination unit 230 of the fact of reaching the attack point and information for identifying the single route information being analyzed. The notification of the fact of reaching the attack point and the information for identifying the single route information being analyzed may be referred to as notification G.

Through the notification G, the vulnerability existence determination unit 230 can recognize that the process has reached a position where the vulnerability can be determined in the program flow in the single route information. Further, the vulnerability existence determination unit 230 can recognize that the preparation for determining the vulnerability has been completed in the single route information.

Figure 5B:
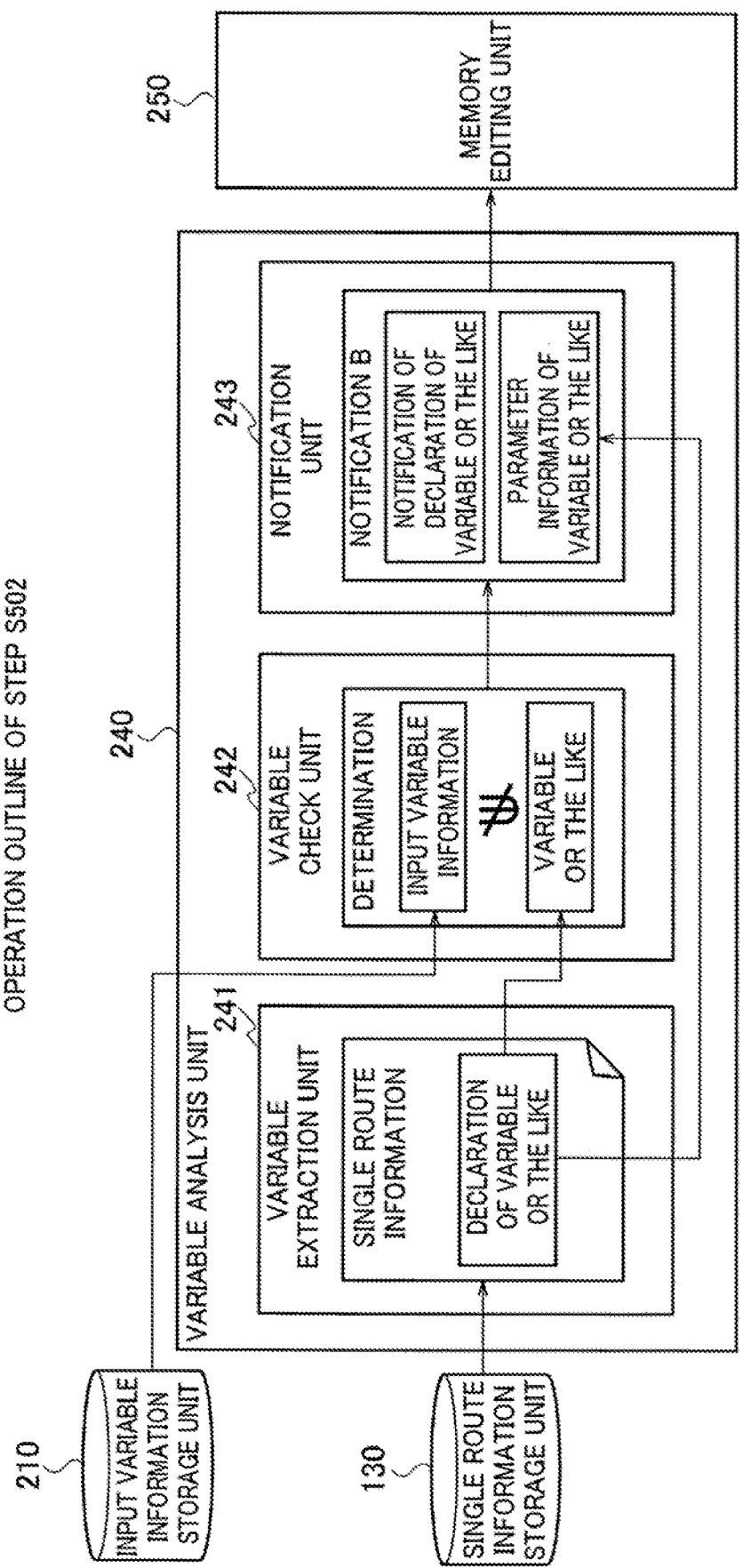
FIG. 5B is a diagram illustrating an example of an operation of step S502 in FIG. 5A of the variable analysis unit according to the present embodiment.

FIG. 5B is a schematic diagram illustrating an outline of the operation of step S502. The variable analysis unit 240 includes a variable extraction unit 241, a variable check unit 242, and a notification unit 243. The variable extraction unit 241 inputs the single route information from the single route information storage unit 130, recognizes the declaration of the variable or the like included in the single route information, extracts the variable or the like, and outputs the variable or the like to the variable check unit 242. The variable check unit 242 inputs the input variable information from the input variable information storage unit 210. The variable check unit 242 checks whether or not the variable or the like is specified in the input variable information. When the variable or the like is not specified in the input variable information, the variable check unit 242 outputs the fact that the variable or the like is declared and the parameter information of the variable or the like to the notification unit 243 as the notification B. The notification unit 243 outputs the notification B input from the variable check unit 242 to the memory editing unit 250.

FIG. 5C is a schematic diagram illustrating an outline of the operation of step S503. The variable extraction unit 241 indicates the operation in step S502. The variable check unit 242 checks whether or not the variable or the like is specified in the input variable information. When the variable or the like is specified in the input variable information, the variable check unit 242 outputs, to the notification unit 243, the fact that the input variable or the like belonging to the input variable information is declared and the parameter information of the variable or the like as the notification C. The notification unit 243 outputs the notification C input from the variable check unit 242 to the memory editing unit 250.

Figure 5D:
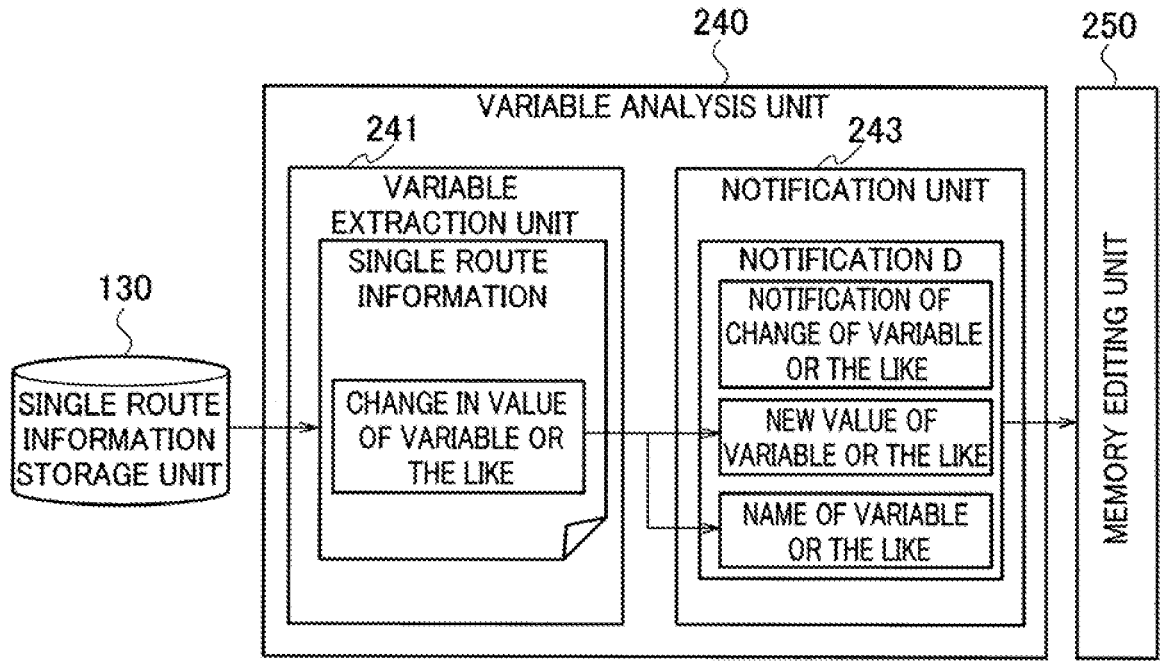
FIG. 5D is a diagram illustrating an example of the operation of step S504 of FIG. 5A of the variable analysis unit according to the present embodiment.

FIG. 5D is a schematic diagram illustrating an outline of the operation of step S504. Every time there is a change in information of values in the memory which is associated with the variable or the like that changes as the single route information is analyzed, the variable extraction unit 241 outputs, to the notification unit 243, a change notification of the variable or the like indicating the fact of the change, a new value of the variable or the like, and the changed variable name as a notification D. The notification unit 243 outputs the notification D input from the variable extraction unit 241 to the memory editing unit 250.

Figure 5E:
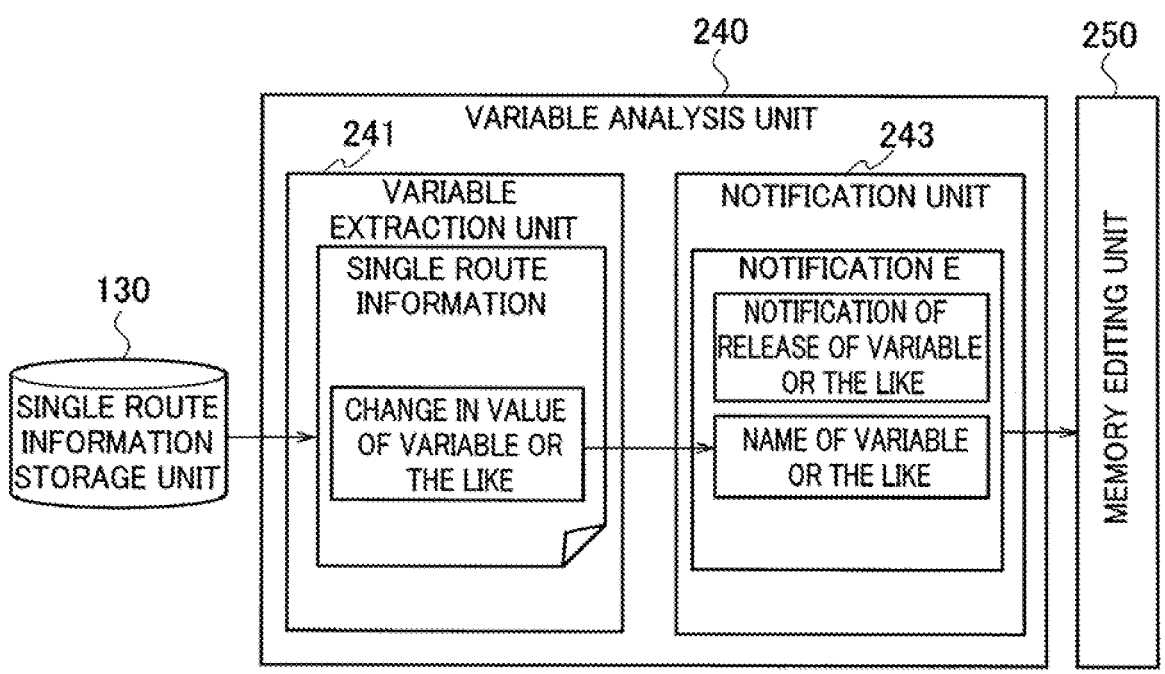
FIG. 5E is a diagram illustrating an example of an operation of step S505 of FIG. 5A of the variable analysis unit according to the present embodiment.

FIG. 5E is a schematic diagram illustrating an outline of the operation of step S505. In a case of analyzing the single route information and when the memory area of the variable or the like is released, the variable extraction unit 241 outputs, to the notification unit 243, release notification indicating the fact that the memory area is released and a name of the released variable or the like, as a notification E. The notification unit 243 outputs the notification E input from the variable extraction unit 241 to the memory editing unit 250.

Figure 5F:
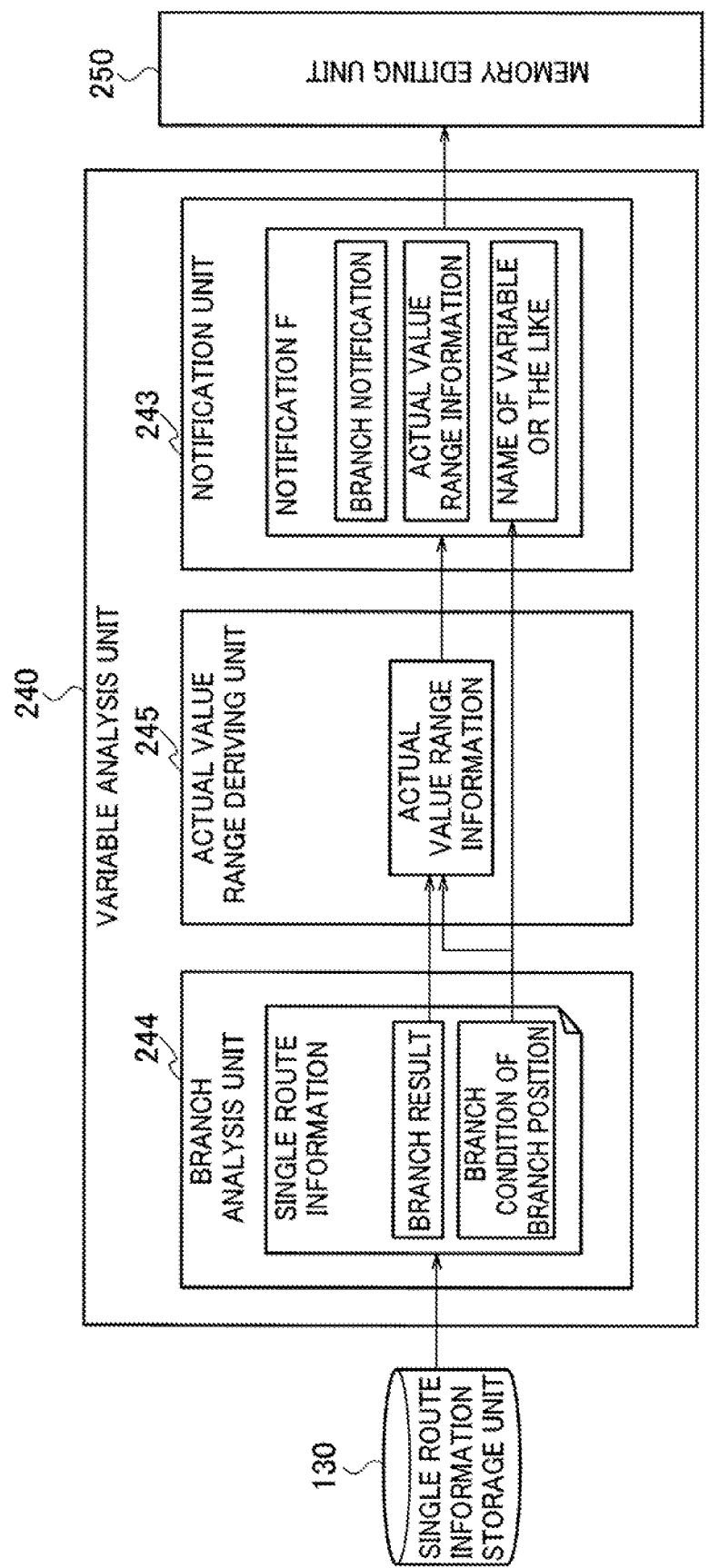
FIG. 5F is a diagram illustrating an example of an operation of step S506 of FIG. 5A of the variable analysis unit according to the present embodiment.

FIG. 5F is a schematic diagram illustrating an outline of the operation of step S506. In a case of analyzing the single route information, when the variable or the like is used for a branch condition of a branch position on the program information, the branching analysis unit 244 extracts a branch result and a branch condition information of the branch position. Further, an actual value range derivation unit 245 derives actual value range information that limits the actual value range from the branch result and the branch condition information of the branch point input from a branching analysis unit 244. The actual value range derivation unit 245 outputs, to the notification unit 243, a branch notification indicating the fact that a variable or the like is used for branching, actual value range information, and the name of the variable or the like, as a notification F. The notification unit 243 outputs the notification F input from the actual value range derivation unit 245 to the memory editing unit 250. Note that, in a case where a plurality of variables or the like are used as the branch condition, the above processing is similarly executed for each variable or the like.

FIG. 5G is a schematic diagram illustrating an outline of the operation of step S507. The variable extraction unit 241 inputs attack point information from the attack point information storage unit 220. The variable extraction unit 241 determines whether or not the position indicated by the attack determination position of the attack point information is reached when the single route information is being analyzed. When reaching the location indicated by the attack determination position, the variable extraction unit 241 outputs, to the notification unit 243, an attack point arrival notification indicating the fact of the attack point arrival, and specification information for specifying the single route information under analysis as a notification G. The notification unit 243 outputs the notification G input from the variable extraction unit 241 to the memory editing unit 250.

FIG. 6A illustrates an example of operations of the memory editing unit 250 and the vulnerability existence determination unit 230.

In step S601, the memory editing unit 250 deletes all the information stored in the virtual memory map storage unit 260 and the variable-or-the-like table storage unit 270 in response to the notification A from the variable analysis unit 240. The above process may be referred to as process H. The process H enables the virtual memory map storage unit 260 and the variable-or-the-like table storage unit 270 to secure the information that is needed to start the analysis of new single route information.

In step S602, the memory editing unit 250 creates a record in the variable-or-the-like table storage unit 270 based on each parameter information in response to the notification B from the variable analysis unit 240. By creating a record, it becomes possible to create a place, in the single route information, for maintaining the value of a variable or the like that changes. In addition, in a case where a variable with a name indicating a variable or the like that does not have a place to store is fraudulently changed or referred, the fraud can be revealed by not finding the corresponding place.

In step S603, in response to the notification B from the variable analysis unit 240, the memory editing unit 250 allocates an area of a memory area amount that can be derived from the parameter information of the variable or the like to the virtual memory map. In other words the memory editing unit 250 gives a virtual address to the record and assigns a unique and continuous virtual address to each area. At this time, one virtual address area is allocated before and after the area on the virtual memory map. Records of virtual addresses left before and after the allocated area on the virtual memory map are allocated with null flag information. By allocating the virtual addresses before and after the reserved virtual address with the null flag to be recognizable, when there is an access to a virtual address that deviates from the virtual address associated with the variable or the like, the determination of the deviated virtual address can be made.

In the variable-or-the-like table storage unit 270, the record of the variable or the like in the variable-or-the-like table holds the value of the smallest virtual address excluding null among the virtual addresses allocated on the virtual memory map, as the head virtual address. Since the area surrounded by null is linked to one variable or the like, the information for uniquely identifying the place where the information of the variable or the like is stored can be stored as being linked to the name of the variable or the like as the head virtual address. An example of a method of securing the area on the virtual memory map and a method of generating a record in the variable-or-the-like table will be described later. The processes of steps S602 and S603 may be referred to as process I.

In step S604, in response to the notification C from the variable analysis unit 240, the memory editing unit 250 executes following process on the record having the virtual address allocated on the virtual memory map by the parameter information of the variable or the like included in the notification C. In other words, the memory editing unit 250 applies an input flag to all the records having the virtual address except the record having the virtual address having the null flag. By setting the input flag, it can be specified that the record is an input variable, and since the record can be specified, it is possible to efficiently analyze the range that the input variable can have after the analysis is completed. Note that the process of step S604 may be referred to as process J.

In step S605, in response to the notification D from the variable analysis unit 240, the memory editing unit 250 refers to the variable-or-the-like table storage unit 270 and acquires a head virtual address included in the record corresponding to the name of the variable or the like included in the notification D. The virtual address of the record to be processed on the virtual memory map is recognized. As the value of the actual value field of the record having the acquired virtual address, a new value of a variable or the like included in the notification D are held in the virtual memory map. In the single route information, by maintaining the value of the variable or the like that changes as associating with the name of the variable or the like, the name of the variable or the like can be referred to as a key in the subsequent analysis. Note that the process of step S605 may be referred to as process K.

In step S606, in response to the notification E from the variable analysis unit 240, the memory editing unit 250 refers to the variable-or-the-like table storage unit 270 and acquires a head virtual address included in the record corresponding to the name of the variable or the like included in the notification E. The virtual address of the record to be processed on the virtual memory map is recognized. The memory editing unit 250 deletes the record having the acquired virtual address and all the records existing before and after the record up to the record having the null flag, including the record having the null flag. Here, the all records described above mean all records between records having the null flag when the virtual address values are arranged in ascending order. It becomes possible to perform processing based on a fact that variables or the like that are declared not to be used in the subsequent processing in the program is deleted. Note that the process of step S606 may be referred to as process L.

In step S607, in response to the notification F from the variable analysis unit 240, the memory editing unit 250 refers to the variable-or-the-like table storage unit 270 and acquires a head virtual address included in the record corresponding to the name of the variable or the like included in the notification F. The virtual address of the record to be processed on the virtual memory map is recognized. The memory editing unit 250 additionally maintains the actual value range information included in the notification F in the actual value range field of the record on the virtual memory map having the acquired virtual address. By setting the actual value range information, the possible range as the value of the virtual address indicated by the record on the virtual memory map can be limited. Note that the process of step S607 may be referred to as process M.

In step S608, in response to the notification G from the variable analysis unit 240, the vulnerability existence determination unit 230 inputs attack point information from the attack point information storage unit 220 and acquires the attack execution condition. The vulnerability existence determination unit 230 extracts the names of the variables or the like used in the attack execution condition, and acquires the head virtual address associated with the name of each variable or the like from the variable-or-the-like table storage unit 270. The vulnerability existence determination unit 230 acquires the actual value information and the actual value range information associated with the head virtual address from the virtual memory map storage unit 260. When the record is a record having an input flag, the vulnerability existence determination unit 230 limits the actual value information of the record using the actual value range information of the record and sets limited input actual value information. When the record is a record having an input flag, the vulnerability existence determination unit 230 determines whether the limited input actual value information satisfies the attack execution condition. Further, when the record is a record with no input flag, the vulnerability existence determination unit 230 determines whether or not the actual value information satisfies the attack execution condition.

It should be noted that, from the acquisition of the attack execution condition to the determination of the attack execution condition, the vulnerability existence determination unit 230 performs processing for all variables or the like used in the attack execution condition. When the attack execution condition is satisfied by any of the variables or the like, the processing for "a case where the attack execution condition is satisfied" described below is performed, and when all variables do not satisfy the attack execution condition, the processing for "a case where the attack execution condition is not satisfied" described below is performed.

(A Case where the Attack Execution Condition is Satisfied)

The vulnerability existence determination unit 230 extracts records having all input flags from the virtual memory map storage unit 260, and acquires the value of the actual value field of the extracted records as input actual value information. Regarding the input actual value information, the value range is limited using the actual value range information that can be acquired from the actual value range field of the record associated with each input actual value information and limited input actual value information is set. At this time, when the value indicated by the limited input actual value information does not exist since the range is limited, or when there is no record having the input flag on the virtual memory map, the result is output without the limited input actual value information. Note that since the limited input actual value information associated with the variables or the like included in the attack execution condition has already been acquired in the above-described processing, this processing may be performed only for records having other input flags. The single route information specification information, the limited input actual value information, and the fact that vulnerability exists, which are included in the notification G notified from the variable analysis unit 240, are output as the analysis result regarding the single route information. When the unanalyzed single route information exists, the variable analysis unit 240 continues the analysis, and when unanalyzed single route information does not exist, the analysis ends.

(A Case where the Attack Execution Condition is not Satisfied)

When the unanalyzed single route information exists, the variable analysis unit 240 continues the analysis, and when unanalyzed single route information does not exist, the analysis ends.

Figure 6B:
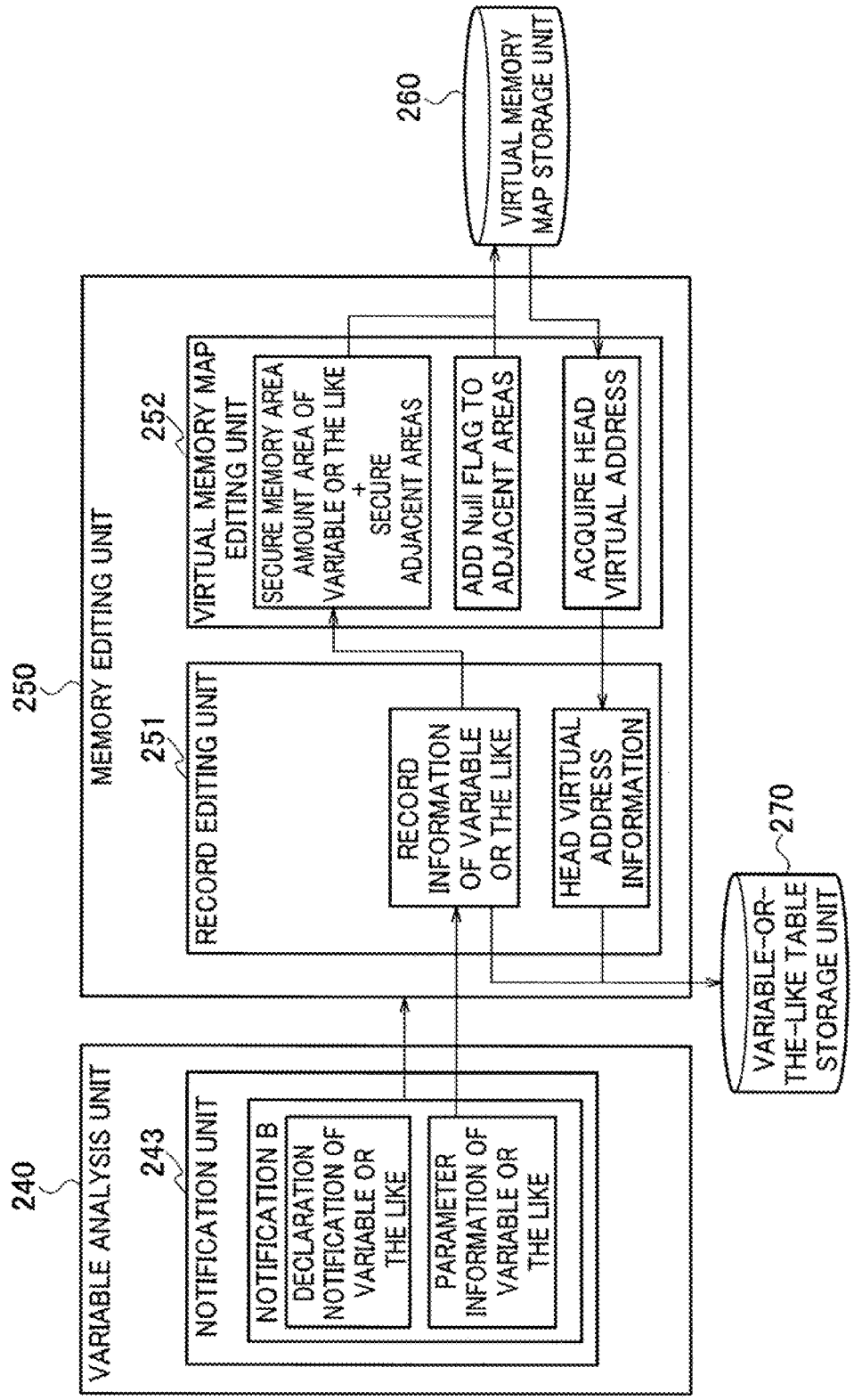
FIG. 6B is a diagram illustrating an example of operations of steps S602 and S603 of FIG. 6A of the memory editing unit according to the present embodiment.

FIG. 6B is a schematic diagram illustrating an outline of the operation of steps S602 and S603. The variable analysis unit 240 notifies the memory editing unit 250 of declaration notification of variables or the like, and the parameter information of the declared variables or the like. A record editing unit 251 creates a record from the parameter information of the variables or the like in the variable-or-the-like table storage unit 270 based on each piece of parameter information. A virtual memory map editing unit 252 allocates on the virtual memory map an area having a memory area amount that can be derived from the parameter information of the variable or the like. In other words, the virtual memory map editing unit 252 applies a virtual address to the record and allocates a unique and continuous virtual address to each area. At this time, one virtual address area is allocated before and after the area on the virtual memory map. Records of virtual addresses left before and after the allocated area on the virtual memory map are allocated with null flag information. By allocating the virtual addresses before and after the reserved virtual address with the null flag to be recognizable, when there is an access to a virtual address that deviates from the virtual address associated with the variable or the like, the determination of the deviated virtual address can be made. The virtual memory map editing unit 252 acquires the head virtual address for each variable or the like from the virtual memory map storage unit 260, and the record editing unit 251 stores the head virtual address in the variable-or-the-like table storage unit 270.

FIG. 6C is a schematic diagram illustrating an outline of the operation of step S604. In response to the notification C from the variable analysis unit 240, the memory editing unit 250 executes following process on the record having the virtual address allocated on the virtual memory map by the parameter information of the input variable or the like included in the notification C. In other words, the virtual memory map editing unit 252 stores, in the virtual memory map storage unit 260, all the record having the virtual address except the record having the virtual address having the null flag, with the input flag. By setting the input flag, it can be specified that the record is an input variable, and since the record can be specified, it is possible to efficiently analyze the range that the input variable can have after the analysis is completed.

FIG. 6D is a schematic diagram illustrating an outline of the operation of step S605. In response to the notification D from the variable analysis unit 240, the memory editing unit 250 refers to the variable-or-the-like table storage unit 270 and acquires a head virtual address included in the record corresponding to the name of the variable or the like included in the notification D. The virtual address of the record to be processed on the virtual memory map is recognized. The virtual memory map editing unit 252 stores the new value of a variable or the like included in the notification D in the virtual memory map storage unit 260 as the value of the actual value field of the record having the acquired virtual address so as to be held in the virtual memory map. In the single route information, by maintaining the value of the variable or the like that changes as associating with the name of the variable or the like, the name of the variable or the like can be referred to as a key in the subsequent analysis.

FIG. 6E is a schematic diagram illustrating an outline of the operation of step S606. In response to the notification E from the variable analysis unit 240, the record editing unit 251 refers to the variable-or-the-like table storage unit 270 and acquires a head virtual address included in the record corresponding to the name of the variable or the like included in the notification E. The virtual memory map editing unit 252 deletes, from the virtual memory map storage unit 260, the record having the acquired virtual address and all the records existing before and after the record up to the record having the null flag, including the record having the null flag. Here, the all records described above mean all records between records having the null flag when the virtual address values are arranged in ascending order from the head virtual address.

Figure 6F:
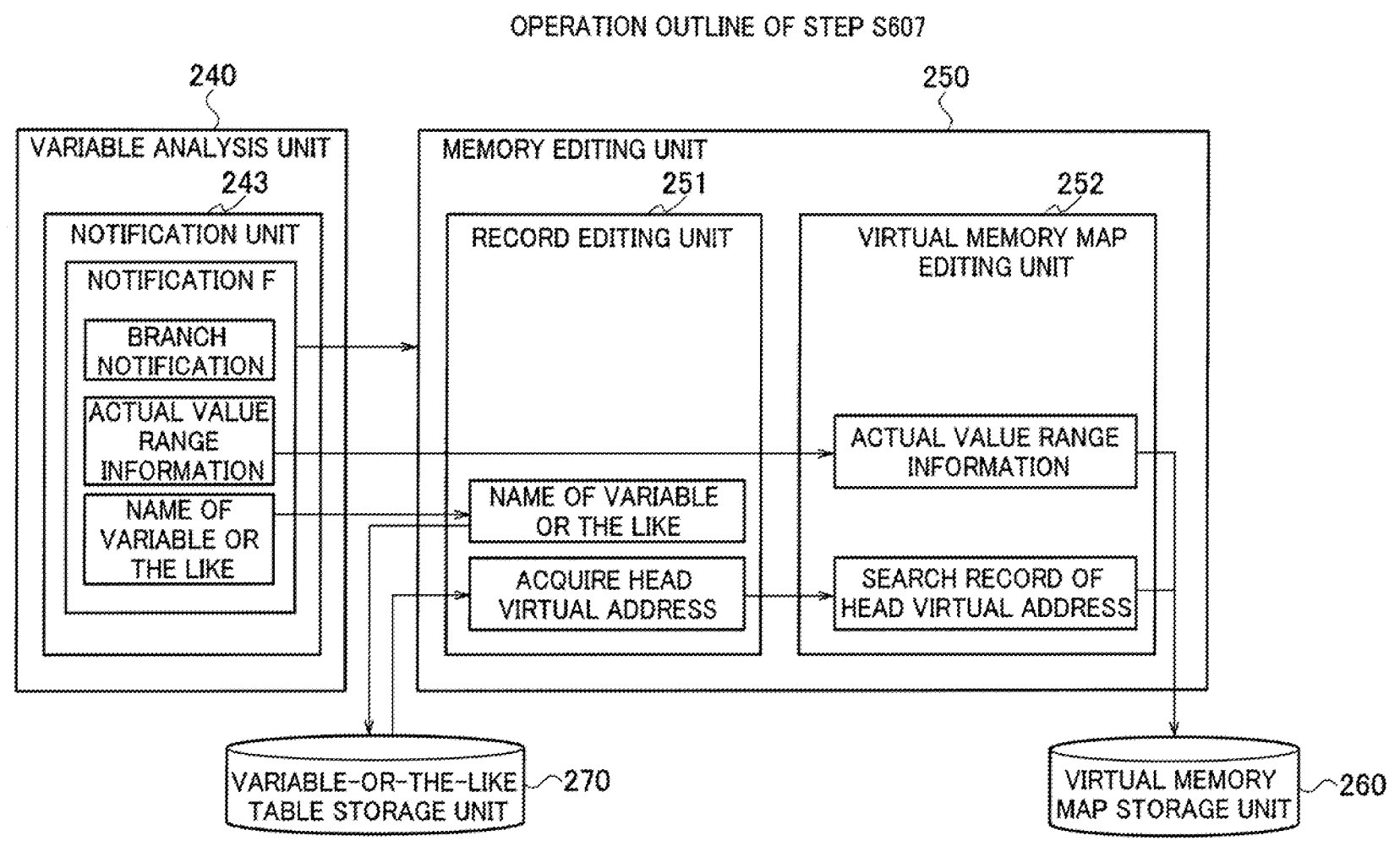

FIG. 6F is a schematic diagram illustrating an outline of the operation of step S607. In response to the notification F from the variable analysis unit 240, the record editing unit 251 refers to the variable-or-the-like table storage unit 270 and acquires a head virtual address included in the record corresponding to the name of the variable or the like included in the notification F. The virtual memory map editing unit 252 additionally maintains the actual value range information included in the notification F in the actual value range field of the record on the virtual memory map having the acquired virtual address and stores the information in the virtual memory map storage unit 260. By setting the actual value range information, the possible range as the value of the virtual address indicated by the record on the virtual memory map can be limited.

FIG. 6G is a schematic diagram illustrating an outline of the operation of step S608. In response to the notification G from the variable analysis unit 240, the vulnerability existence analysis unit 234 inputs attack point information from the attack point information storage unit 220 and acquires the attack execution condition. The record editing unit 231 extracts the names of the variables or the like used in the attack execution condition, and acquires the head virtual address associated with the name of each variable or the like from the variable-or-the-like table storage unit 270. The limited actual value calculation unit 233 acquires the actual value information and the actual value range information associated with the head virtual address from the virtual memory map storage unit 260. When the record is a record having an input flag, the vulnerability existence analysis unit 234 limits the actual value information of the record using the actual value range information of the record and sets limited input actual value information. When the record is a record having an input flag, the vulnerability existence analysis unit 234 determines whether the limited input actual value information satisfies the attack execution condition. Further, when the record is a record having no input flag, the vulnerability existence analysis unit 234 determines whether or not the actual value information satisfies the attack execution condition.

When the vulnerability existence analysis unit 234 determines that the attack execution condition is satisfied, the vulnerability existence determination unit 230 performs the following processing. The limited actual value calculation unit 233 extracts all records having the input flag from the virtual memory map storage unit 260, and acquires the value of the actual value field of the extracted records as the input actual value information. Regarding the input actual value information, the value range is limited using the actual value range information that can be acquired from the actual value range field of the record associated with each input actual value information and limited input actual value information is set. At this time, when the value indicated by the limited input actual value information does not exist since the range is limited, or when there is no record having the input flag on the virtual memory map, the result is output without the limited input actual value information. The vulnerability existence analysis unit 234 outputs, to an output unit 235, the single route information specification information, the limited input actual value information, and the fact that vulnerability exists, which are included in the notification G notified from the variable analysis unit 240, as the analysis result information regarding the single route information.

FIG. 7A is a schematic diagram illustrating a case where a variable or the like according to the present embodiment is a direct address value in a memory. When the variable or the like is an address value directly on the memory, the virtual address is allocated on the virtual memory map without using the variable-or-the-like table, and at the same time, a real address value is arranged in association with the virtual address. FIG. 7A illustrates a case where the real address is "0xFF01" and the real address value is "60". When the head virtual address corresponding to the real address "0xFF01" is "0x4001", null flags are set to the virtual addresses "0x4000" and "0x4002".

FIG. 7B is a schematic diagram illustrating a case where the variables or the like according to the present embodiment are variables. When the variable or the like according to the present embodiment is a variable, a variable table is used as the variable-or-the-like table. The variable table has a record having a variable name of a variable, a head virtual address, and a variable type. Further, in the virtual memory map, the same amount of memory area amount as the variable type is secured. In FIG. 7B, since the variable name of the variable is "cData" and the type of the variable is "char", the memory area amount of 1 byte is secured. When the variable name of the variable is "cData" and the head virtual address is "0x0001", null flags are set to the virtual addresses "0x0000" and "0x0002".

FIG. 7C is a schematic diagram illustrating a case where the variables or the like according to the present embodiment are unions.

When the variable or the like according to the present embodiment is a union, a union table is used as the variable-or-the-like table, and a common union name is stored in the union table. Further, a record with the head virtual address, a type of an element, and the variable type of the element is stored. Further, in the virtual memory map, the maximum amount of memory area is secured among the types of the elements of the union. In FIG. 7B, since the variable type in a case that the element type is "iValue" is "int", the memory area amount of 4 bytes is secured. When the head virtual address of the union is "0x2001", null flags are set to the virtual addresses "0x2000" and "0x2005".

FIG. 7D is a schematic diagram illustrating a case where the variables or the like according to the present embodiment are structures.

When the variable or the like according to the present embodiment is a structure, a structure table is used as the variable-or-the-like table, and a common structure name is stored in the structure table. Further, a record with the head virtual address, a type of an element, and the variable type of the element is stored. Further, in the virtual memory map, the total memory area amount calculated by a sum of the memory area amounts derived from the types of all the elements of the structure is secured.

FIG. 7E is a schematic diagram illustrating a case in which the variables or the like according to the present embodiment are arrays.

When the variable or the like according to the present embodiment is an array, an array table is used as the variable-or-the-like table, and the array table is used to store a record including a variable name of the array, a head virtual address, a type of an element, and a number of dimensions of the array. Further, in the virtual memory map, the total memory area amount calculated by the product of the memory area amount derived from the element type of the array and the dimension number of the array is secured.

Modification

Figure 8A:
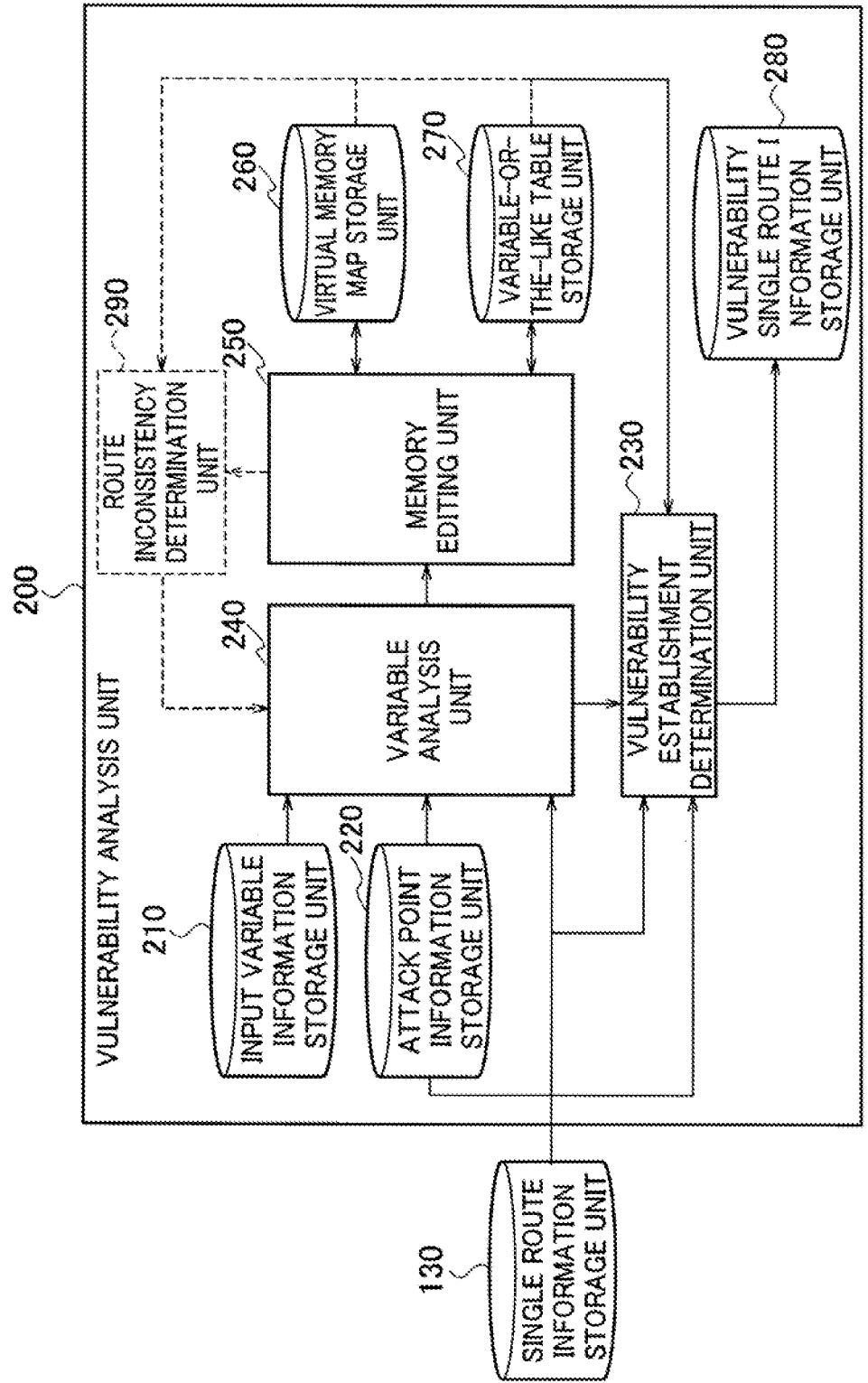
FIG. 8A is a diagram illustrating an example in which a route inconsistency determination unit is added to the vulnerability analysis unit according to the present embodiment.

FIG. 8A illustrates an additional function of the above-described embodiment, and the additional function is realized by a configuration including a route inconsistency determination unit 290. The operations of the memory editing unit 250, the route inconsistency determination unit 290, and the variable analysis unit 240 related to the additional function will be described below.

Figure 8B:
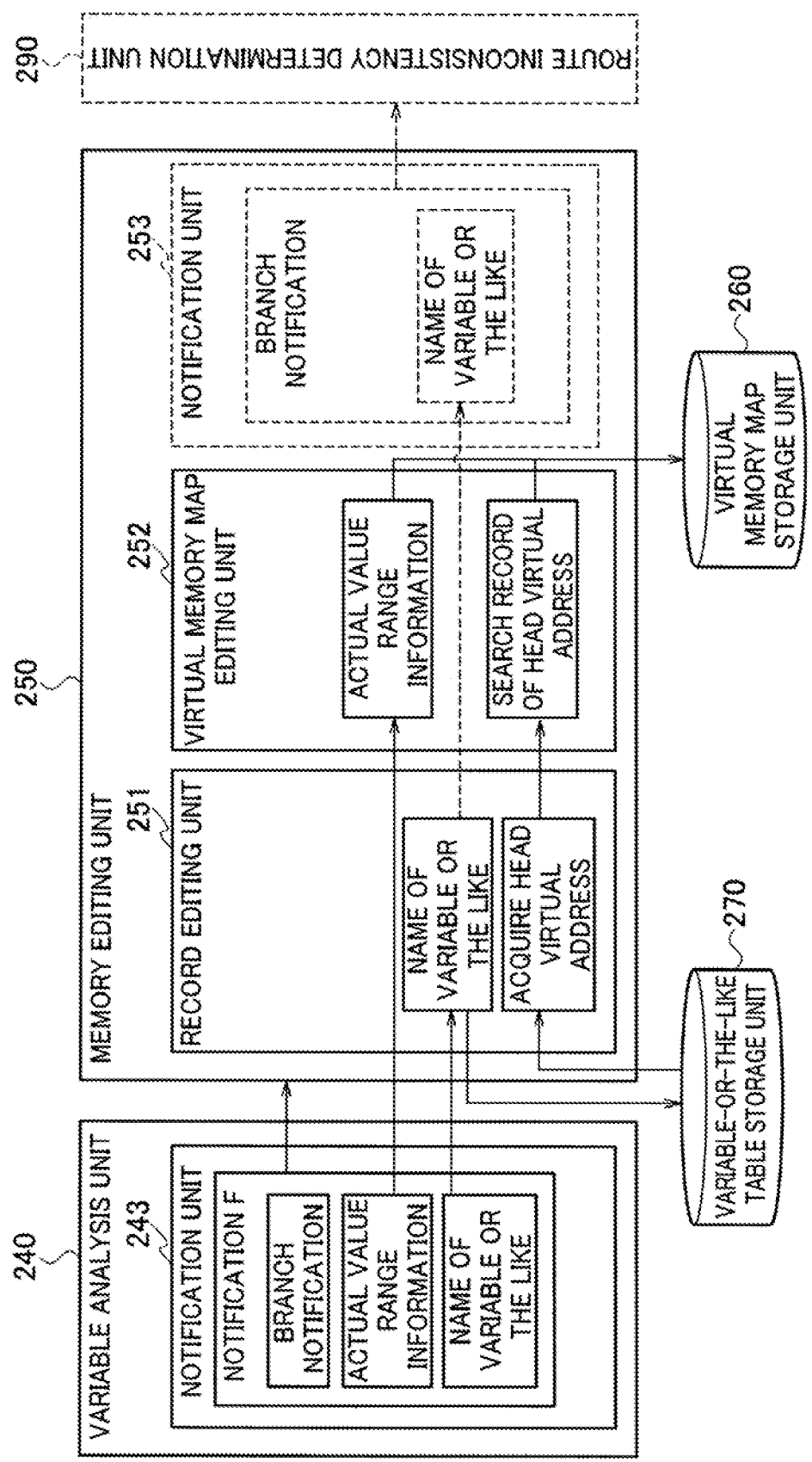
FIG. 8B is a diagram illustrating an example of an additional function of the memory editing unit in a case where the route inconsistency determination unit according to the present embodiment is added.

FIG. 8B is a schematic diagram for explaining the additional function of the memory editing unit 250 for realizing the additional function of FIG. 8A.

The memory editing unit 250 performs the following functions in addition to the process M of step S607.

In the process M, in response to the notification F from the variable analysis unit 240, the record editing unit 251 refers to the variable-or-the-like table storage unit 270 and acquires a head virtual address included in the record corresponding to the name of the variable or the like included in the notification F. As a function to be added, when the record on the virtual memory map having the acquired virtual address does not have the input flag, the virtual memory map editing unit 252 includes the name of the variable or the like notified from the variable analysis unit 240 in a branch notification and notifies the route inconsistency determination unit 290. The variable analysis unit 240 that has sent the notification F, which is a notification branched according to the variable information, stops the sequential analysis of the program information to be evaluated until a notification is received from the route inconsistency determination unit 290.

Upon receiving the branch notification from the memory editing unit 250, the route inconsistency determination unit 290 executes the following processing.

In response to the branch notification from the memory editing unit 250, a variable-or-the-like table reading unit 291 refers to the variable-or-the-like table storage unit 270 and acquires a head virtual address included in the record corresponding to the name of the variable or the like included in the branch notification. The route inconsistency determination unit 290 can recognize the virtual address of the record to be processed on the virtual memory map.

A route inconsistency analysis unit 293 analyzes presence/absence of a logical inconsistency between the information included in the actual value field of the record having the recognized virtual address and the information included in the actual value range field of the record having the virtual address. Here, inconsistency is determined based on whether or not the actual value is included in the actual value range. Note that the actual value range may be determined based on a plurality of different branch notifications.

Figure 8C:
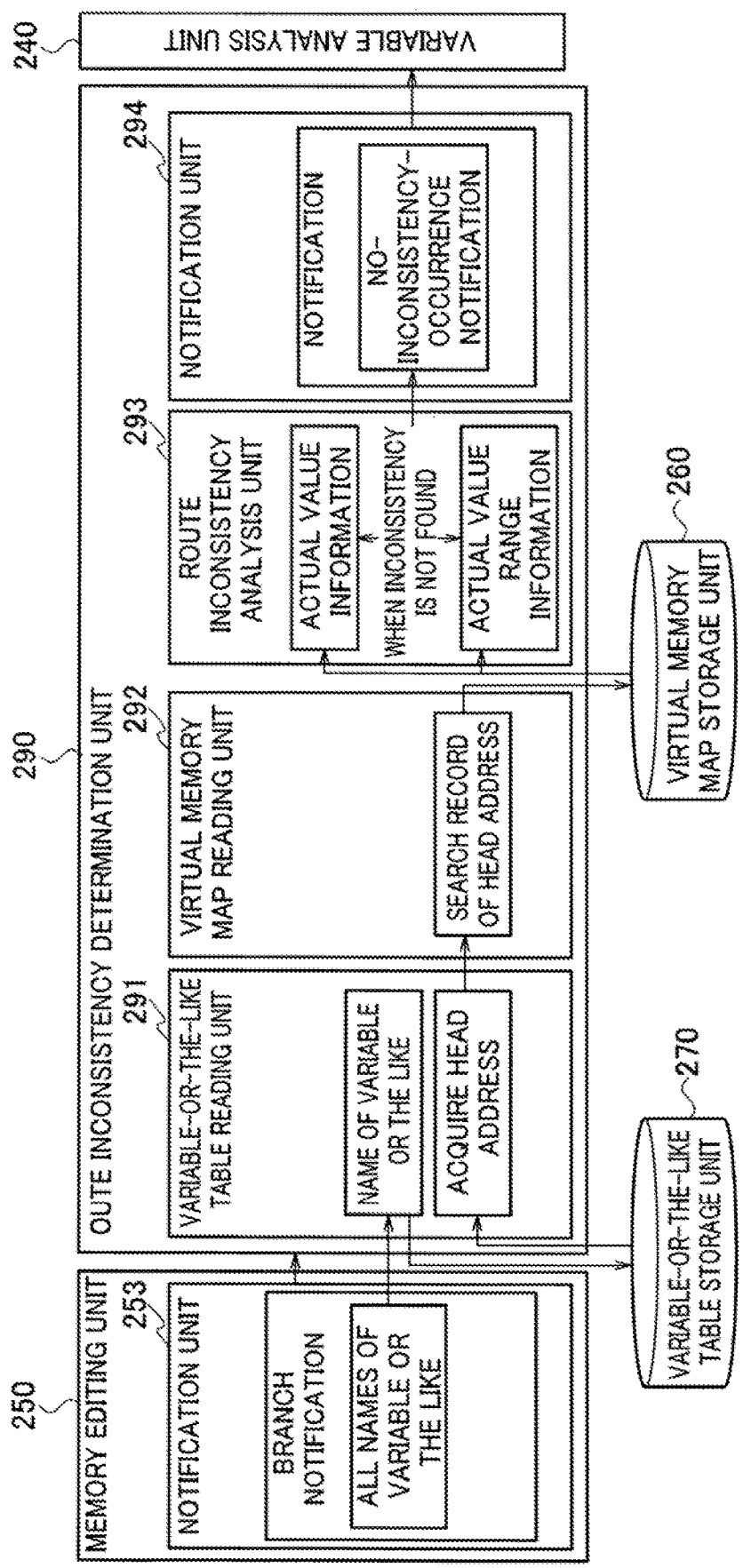
FIG. 8C is a diagram illustrating an example of an operation of the route inconsistency determination unit according to the present embodiment.
Figure 8D:
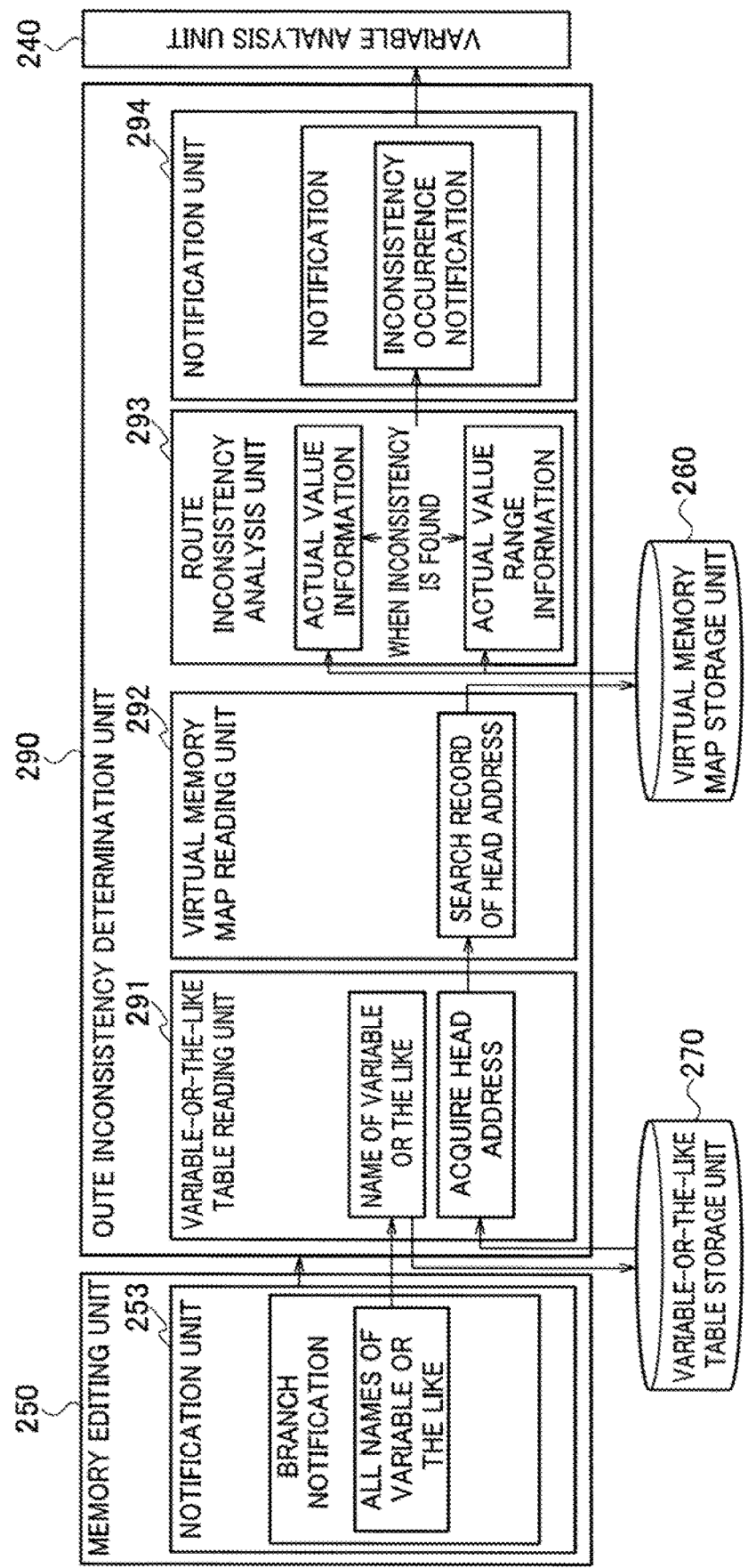
FIG. 8D is a diagram illustrating an example of an operation of the route inconsistency determination unit according to the present embodiment.

When inconsistency is found, the fact that the inconsistency has occurred is notified to the variable analysis unit 240 of an inconsistency occurrence notification (FIG. 8D). Regarding the single route information being analyzed, since a branch route is inconsistent with that of the variable information used in the single route information, it can be determined that it becomes clear that the flow in the program indicated by the single route information is not traced further than the present analysis.

When receiving the inconsistency occurrence notification from the route inconsistency determination unit 290, the variable analysis unit 240 stops the analysis of the single route information currently being analyzed and shifts to analysis of the next single route information. Since it is determined that the single route information being analyzed cannot be traced further than the current analysis, the variable analysis unit 240 can stop useless analysis.

When no inconsistency is found, the fact that no inconsistency has been found is notified to the variable analysis unit 240 by a no-inconsistency-occurrence notification (FIG. 8C). Regarding the single route information being analyzed, there is no inconsistency of the branch route with the variable information used in the single route information. Therefore, in the analysis range up to present, it can be determined that there is a possibility that the flow on the program indicated by the single route information may be traced.

When receiving the no-inconsistency-occurrence notification from the route inconsistency determination unit 290, the variable analysis unit 240 continues to analyze the single route information being currently analyzed. Regarding the single route information being analyzed, since it is determined that there is a possibility of tracing the program flow indicated by the single route information, the variable analysis unit 240 can continue the analysis.

Note that the processing procedure showing an example of a flowchart of the operation in the vulnerability analyzer 1000 is processed as follows. In other words, a central processing unit (CPU) executes each process according to a program stored in a read only memory (ROM) of a computer included in the vulnerability analyzer 1000.

Note that a part or all of the above-described processing procedure is executed by hardware such as a digital signal processor (DSP) or an application specific integrated circuit (ASIC). However, according to the present embodiment, the case where the CPU executes the program according to the program in the ROM has been described.

As described above, according to the present embodiment, in order to express the situation in which a protection status of the protected asset is established by a logical expression, the vulnerability can be found only in a case where the protection status of the protected asset is violated. In addition, since the state where the protection status of the protected asset is established can be expressed, by a logical expression, with a state directly relating to a process that is undesired to occur in the program, the logical expression can be expressed with less knowledge about security.

COMPARATIVE EXAMPLE

In the related art, there is a configuration that comprehensively confirms, for all routes, that an evaluation target program does not reach a specific status. However, it is very redundant to comprehensively confirm all the routes, and this causes a great waste of calculation resources and calculation time.

However, in the vulnerability analyzer 1000 according to the present embodiment, since the vulnerability is confirmed for the route between the attack determination position and the start position, this allows to exclude the route on the flow including the program processing of an evaluation target that does not need to be confirmed. As a result, an efficient vulnerability evaluation means without a great waste of calculation resources and calculation time can be provided.

Further, in the related art, there is a configuration in which a degree of coincidence with respect to a failure occurrence condition and characteristics of an illegal command and illegal data is stochastically calculated, and the vulnerability of the evaluation target program is evaluated. However, with this configuration, since the vulnerability of the evaluation target program is stochastically evaluated, there is no certainty and comprehensiveness for the vulnerability evaluation.

However, the vulnerability analyzer 1000 according to the present embodiment has a configuration in which, for all routes between the attack determination position and the start position, the vulnerabilities are confirmed based on the attack execution conditions, so that there are the certainty and comprehensiveness of the vulnerability evaluation. Therefore, detection failure does not occur.

Further, in the related art, there is a configuration in which a test case prepared in advance is used to select a test case effective for the evaluation target program. However, with this configuration, an attack using a means that exceeds the range prepared in advance cannot be dealt with, and thus detection failure for the vulnerability may occur.

However, the vulnerability analyzer 1000 according to the present embodiment can analyze the source code itself and extract an attack route, and can derive all the input values that can use the attack route. Furthermore, there is no need to prepare test cases to be selected in advance.

Further, in the related art, when selecting the route of the evaluation target program, there is a configuration in which the relevance to a keyword designated in advance is selected as a condition. However, in the evaluation target program, the same keyword may have different meanings. In addition, different keywords may have the same information in the evaluation target program. As described above, when the relation with the keyword is used as a condition, there may be a case where the route selection is incomplete, and the vulnerability may not be detected. In addition, in the related art, a configuration is provided in which transition conditions of the state transition in a certain specific state are not duplicated. However, in the case where the parameters that are not related to the transition condition in the specific state are different, there is a possibility that an attack route exists in the program flow, and thus vulnerability detection failure may occur.

However, since the vulnerability analyzer 1000 according to the present embodiment has a configuration that all attack routes other than the route that does not need to be confirmed is analyzed, there are certainty and comprehensiveness for the vulnerability evaluation. Therefore, detection failure does not occur.

Further, in the related art, it is determined that a bug has occurred by confirming that an abnormal point in the evaluation target program is reached. However, in security that evaluates vulnerabilities, since it is necessary to detect that an abnormal operation occurs at a normal point of a program, vulnerabilities may not be detected in this determination.

However, the vulnerability analyzer 1000 according to the present embodiment makes the determination at the designated attack determination position, and the attack determination position is a position that can be designated at any position in the program. Therefore, the vulnerability analyzer 1000 according to the present embodiment can detect a vulnerability on a normal route, which is not an exceptional process that is an abnormal point in a program.

The features of the vulnerability analyzer 1000 according to the present embodiment will be described below.

A vulnerability analyzer 1000, according to a first aspect of the disclosure, for evaluating presence or absence of an information security vulnerability in an evaluation target program includes a single route derivation unit 100 that carries out the following processing. The single route derivation unit 100 derives single route information that is route information from an attack determination position where determination of existence of vulnerability of the program information can be made to a start position of the program information, and information of a route derived by dividing with a branch in the program information. The single route information maintains each processing of the program information in the processing order.

Further, the vulnerability analyzer 1000 according to the first aspect includes a variable analysis unit 240 that analyzes the single route information from the start position to the attack determination position and derives actual value range information that limits the range of the actual value from the information of the branch condition on the program information and the branch result information.

Furthermore, the vulnerability analyzer 1000 according to the first aspect includes a memory editing unit 250 that performs the following processing. The memory editing unit 250 sets the virtual address corresponding to the input variable information and the input flag corresponding to the virtual address when the input variable information is designated, and stores the actual value information of the input variable information to the actual value field of the virtual address. Further, the memory editing unit 250 acquires the virtual address corresponding to the actual value range information notified from the variable analysis unit 240, and stores the actual value range information in the actual value range field of the virtual address.

Furthermore, the vulnerability analyzer 1000 according to the first aspect includes a vulnerability existence determination unit 230 that performs the following processing. The vulnerability existence determination unit 230 extracts the variable information used in the attack execution condition at the attack determination position, acquires the virtual address corresponding to the variable information, and acquires the actual value information and the actual value range information corresponding to the virtual address. When the input flag is set to the virtual address, the vulnerability existence determination unit 230 calculates limited input actual value information that limits the actual value information by the actual value range information, and determines whether or not the limited input actual value information satisfies the attack execution condition. The vulnerability existence determination unit 230 determines whether the actual value information corresponding to the virtual address satisfies the attack execution condition when the input flag is not set for the virtual address.

According to the above configuration, it is possible to provide a specific method for confirming whether or not there is a possibility that the program will reach a particular inconvenient state due to an illegal input.

In the vulnerability analyzer 1000 according to a second aspect of the disclosure, the attack execution condition is expressed with a logical expression using variable information which can be used in program information.

According to the above configuration, in order to express the situation in which a protection status of the protected asset is not established by a logical expression, the vulnerability can be found only in a case where the protection status of the protected asset is violated.

The input variable information of the vulnerability analyzer 1000 according to a third aspect of the disclosure is variable information including a variable for maintaining information input from outside of the evaluation target program. The variable information is information including variables, direct address values in memory, unions, structures, and arrays.

According to the above configuration, by specifying the input information to the program as the information used to establish an attack route, it is possible to satisfy the certainty and comprehensiveness of the vulnerability evaluation and suppress the occurrence of detection failure.

The memory editing unit 250 of the vulnerability analyzer 1000 according to a fourth aspect of the disclosure sets null flags to virtual addresses before and after the virtual address area corresponding to the variable information.

According to the above configuration, the virtual addresses before and after the secured virtual address are given the null flag so that they can be recognized. By making the null flag recognizable, when a virtual address deviating from the virtual address associated with a variable or the like is accessed, it is possible to perform determination of the deviating virtual address.

The vulnerability existence determination unit 230 of the vulnerability analyzer 1000 according to a fifth aspect of the disclosure extracts all virtual addresses having the input flag when the attack execution condition is satisfied, and sets a value of the actual value field of the virtual address as the input actual value information. Furthermore, the vulnerability existence determination unit 230 sets the value limited by the value of the actual value range information field corresponding to the input actual value information as the limited input actual value information, and does not output the limited input actual value information when the limited input actual value information does not exist in the value of the actual value field.

According to the above configuration, it is possible to suppress detection and output of limited input actual value information that cannot exist.

In the vulnerability existence determination unit 230 of the vulnerability analyzer 1000 according to a sixth aspect of the disclosure, when the attack execution condition is not satisfied, the variable analysis unit 240 continues to analyze another piece of the single route information when there is another piece of single route information. The vulnerability existence determination unit 230 determines whether or not the attack execution condition is satisfied in the analyzed another piece of single route information.

According to the above configuration, all routes are analyzed except the route that does not need to be checked, so it is possible to satisfy the certainty and comprehensiveness of the vulnerability evaluation and suppress the occurrence of detection failure.

The memory editing unit 250 of the vulnerability analyzer 1000 according to a seventh aspect of the disclosure notifies the route inconsistency determination unit 290 of the variable information, when the input flag is not set in the virtual address corresponding to the variable information used for the actual value range information. The route inconsistency determination unit 290 determines whether or not the actual value information included in the actual value field of the record having the virtual address corresponding to the variable information is included in the actual value range information included in the actual value range field of the record having the virtual address. When the actual value information is not included in the actual value range information, the route inconsistency determination unit 290 notifies the variable analysis unit 240 of an inconsistency occurrence notification indicating that there is a logical inconsistency. The variable analysis unit 240 stops the analysis of single route information having a logical inconsistency, and starts the analysis of another piece of single route information when there is another piece of single route information.

According to the above configuration, each time there is a branching process in the analysis of the single route information, it is possible to stop the analysis of the single route information having a logical inconsistency so that the analysis process in the vulnerability analyzer 1000 can be enhanced in speed.

The program information of the vulnerability analyzer 1000 according to an eighth aspect of the disclosure is information including a processing logic and a procedure of a function realized by a program including a program source code or a control flow graph.

According to the above configuration, by targeting the source code of the evaluation target program, it becomes possible to reliably carry out the analysis as tracing back from the attack determination position to the start position. In other words, an efficient analysis means can be provided since the analysis can be performed as excluding a route that does not reach the attack determination position and does not need to be confirmed. In addition, since all routes are analyzed except for routes that do not need to be confirmed, it is possible to satisfy the certainty and comprehensiveness of the vulnerability evaluation and suppress the occurrence of detection failure.

As described above, according to the present embodiment, in order to express the situation in which a protection status of the protected asset is established by a logical expression, the vulnerability can be found only in a case where the protection status of the protected asset is violated. In addition, since the state where the protection status of the protected asset is established can be expressed, by a logical expression, with a state directly relating to a process that is undesired to occur in the program, the logical expression can be expressed with less knowledge about security.

Although various embodiments have been described above, some or all of these embodiments may be combined to form a new embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A vulnerability analyzer comprising:
   a memory storing instructions; and
   at least one hardware processor configured to execute the instructions to implement:
   deriving single route information that maintains each process of program information in order of processing, wherein the single route information comprising route information from an attack determination position where a determination of an existence of a vulnerability of the program information is made to a start position of the program information, and the single route information further comprising information of a single route derived as a division from a route as a branch in the program information;
   analyzing the single route information from the start position to the attack determination position, and deriving value range information that limits a value range of an value from information of a branch condition and a branch result in the program information;
   setting, in a case where it is determined that input variable information is specified by at least one of a user and the at least one hardware processor, a virtual address corresponding to the input variable information and an input flag, storing value information of the input variable information to a value field of the virtual address, acquiring an other virtual address corresponding to other value range information, and storing the other value range information to a value range field of the other virtual address; and
   extracting variable information used in an attack execution condition at the attack determination position, acquiring a second other virtual address corresponding to the variable information, acquiring other value information and second other value range information corresponding to the second other virtual address, calculating limited input value information in which the other value information is limited by the second other value range information in a case where the at least one processor determines that an input flag in the memory indicates the second other virtual address, determining whether or not the limited input value information satisfies the attack execution condition, and determining, in a case where the at least one processor determined that the input flag in the memory does not indicate the second other virtual address, whether or not second other value information corresponding to the second other virtual address satisfies the attack execution condition.

2. The vulnerability analyzer according to claim 1, wherein
   the attack execution condition is expressed with a logical expression of the program information.

3. The vulnerability analyzer according to claim 1, wherein
   the input variable information includes a variable which is used by the evaluation target program to maintain information input from outside of the program, and
   the variable information includes another variable, a direct address value in a memory, a union, a structure, and an array.

4. The vulnerability analyzer according to claim 3, wherein the at least one hardware processor is further configured to execute the instructions to implement setting a null flag to indicate other virtual addresses, other than the virtual address, before and after a virtual address area corresponding to the variable information.

5. The vulnerability analyzer according to claim 4, wherein the at least one hardware processor is further configured to execute the instructions to, in a case where the attack execution condition is satisfied, implement
   extracting all of the other virtual addresses,
   setting a value of the value field as the input value information,
   setting an other value limited by a value range information field corresponding to the input value information as the limited input value information, and outputting the limited input value information in a case where the limited input value information is refrained from existing in the value of the value field.

6. The vulnerability analyzer according to claim 1, wherein the at least one hardware processor is further configured to execute the instructions to, in a case where it is determined that the attack execution condition is not satisfied, analyze an other piece of an other single route information, and determine whether or not the attack execution condition is satisfied in the other piece of the other single route information.

7. The vulnerability analyzer according to claim 1,
wherein the at least one hardware processor is further configured to execute the instructions to, in a case where the input flag is not set to the virtual address notify the route inconsistency determination unit of the variable information, the at least one hardware processor is further configured to execute the instructions to, in a case where value information included in an other value field of a record having the virtual address is not included in the value range information included in the value range field, record inconsistency occurrence notification that indicates that there is a logical inconsistency, and the at least one hardware processor is further configured to execute the instructions to stop analyzing the single route information including the logical inconsistency and start to analyze an other piece of an other single route information when there is the other piece of the other single route information.

8. The vulnerability analyzer according to claim 1, wherein
the program information is information including processing logic and procedure of a function that is realized by a program including program source code or control flow graph.

\* \* \* \* \*